(12) United States Patent
Masese et al.

(10) Patent No.: US 10,862,120 B2
(45) Date of Patent: Dec. 8, 2020

(54) POSITIVE ELECTRODE ACTIVE MATERIAL FOR POTASSIUM ION SECONDARY CELL

(71) Applicant: National Institute of Advanced Industrial Science and Technology, Tokyo (JP)

(72) Inventors: Titus Nyamwaro Masese, Osaka (JP); Masahiro Shikano, Osaka (JP); Hikari Sakaebe, Osaka (JP); Hiroshi Senoh, Osaka (JP); Hikaru Sano, Osaka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 113 days.

(21) Appl. No.: 15/780,472

(22) PCT Filed: Dec. 7, 2016

(86) PCT No.: PCT/JP2016/086424
§ 371 (c)(1),
(2) Date: Nov. 9, 2018

(87) PCT Pub. No.: WO2017/099137
PCT Pub. Date: Jun. 15, 2017

(65) Prior Publication Data
US 2019/0067692 A1    Feb. 28, 2019

(30) Foreign Application Priority Data
Dec. 7, 2015    (JP) .................................. 2015-238901

(51) Int. Cl.
*H01B 1/08* (2006.01)
*H01M 4/00* (2006.01)
(Continued)

(52) U.S. Cl.
CPC .............. *H01M 4/525* (2013.01); *C01G 3/00* (2013.01); *C01G 3/006* (2013.01);
(Continued)

(58) Field of Classification Search
CPC ... H01B 1/00; H01B 1/08; C01G 3/00; C01G 49/00; H01M 4/485; H01M 4/131; H01M 4/505; H01M 4/525
See application file for complete search history.

(56) References Cited

U.S. PATENT DOCUMENTS 5,508,121 A * 4/1996 Sawa ...................... H01M 4/52
429/101
6,979,516 B2 * 12/2005 Kusumoto ............ H01M 4/525
204/192.15
(Continued)

FOREIGN PATENT DOCUMENTS

| | | | |
|---|---|---|---|
| CN | 1750298 | * | 3/2006 |
| JP | H1197067 A | | 4/1999 |

(Continued)

OTHER PUBLICATIONS

Costa et al "Structural and thermal properties of the alkaline cuprate KCuO2", Thermochimacta 269/270 (1995) 591-598.*

(Continued)

*Primary Examiner* — Mark Kopec
(74) *Attorney, Agent, or Firm* — Cesari and McKenna, LLP

(57) ABSTRACT

By using a potassium ion secondary battery positive electrode active material comprising a potassium compound represented by general formula (1): $K_nMO_m$, wherein M is copper or iron, n is 0.5 to 3.5, and m is 1.5 to 2.5, provided is a potassium ion secondary battery positive electrode active material having higher theoretical discharge capacity and higher effective capacity than a potassium secondary (Continued)

battery using Prussian blue as a positive electrode active material.

12 Claims, 13 Drawing Sheets

(51) Int. Cl.
| | |
|---|---|
| H01M 4/525 | (2010.01) |
| H01M 4/131 | (2010.01) |
| H01M 4/505 | (2010.01) |
| H01M 10/054 | (2010.01) |
| C01G 49/00 | (2006.01) |
| H01M 4/485 | (2010.01) |
| C01G 3/00 | (2006.01) |
| C01G 45/12 | (2006.01) |
| H01M 4/62 | (2006.01) |
| H01M 4/02 | (2006.01) |

(52) U.S. Cl.
CPC ......... *C01G 45/1228* (2013.01); *C01G 49/00* (2013.01); *C01G 49/0027* (2013.01); *H01B 1/08* (2013.01); *H01M 4/131* (2013.01); *H01M 4/485* (2013.01); *H01M 4/505* (2013.01); *H01M 4/625* (2013.01); *H01M 10/054* (2013.01); *C01P 2002/72* (2013.01); *C01P 2002/85* (2013.01); *C01P 2004/03* (2013.01); *C01P 2004/61* (2013.01); *C01P 2004/62* (2013.01); *C01P 2006/40* (2013.01); *H01M 2004/028* (2013.01)

(56) References Cited

U.S. PATENT DOCUMENTS

| | | |
|---|---|---|
| 2008/0292959 A1 | 11/2008 | Inoue et al. |
| 2012/0088152 A1 | 4/2012 | Kobori et al. |
| 2013/0252106 A1* | 9/2013 | Numata ................ H01M 4/485 429/220 |
| 2015/0243979 A1 | 8/2015 | Nakahara et al. |

FOREIGN PATENT DOCUMENTS

| | | |
|---|---|---|
| JP | 2006/216510 A | 8/2006 |
| JP | 2009/179501 A | 8/2009 |
| JP | 2012/109246 A | 6/2012 |
| JP | 2015/159010 A | 9/2015 |
| KR | 2013/0113801 A | 10/2013 |
| WO | WO-2010/122984 A1 | 10/2010 |

OTHER PUBLICATIONS

Ramakrishnaiah et al "Electrical Properties of $K_2CuO_2$", International Journal of Physics and Applications, vol. 3, No. 2, (2001), 181-188.*

Komaba et al "Potassium Intercalation into Graphite to Realize High-Voltage/High-Power Potassium-Ion Batteries and Potassium-Ion Capacitors" Electrochemistry Communications vol. 60, pp. 172-175, 2015.

Wessells et al "Copper Hexacyanoferrate Battery Electrodes with Long Cycle Life and High Power" Nature Communications vol. 2, pp. 1-5, 2011.

* cited by examiner

POSITIVE ELECTRODE ACTIVE MATERIAL FOR POTASSIUM ION SECONDARY CELL

CROSS-REFERENCE TO RELATED APPLICATIONS

This application is the National Stage of International Application No. PCT/JP2016/086424, filed Dec. 7, 2016, which claims the benefit of Japanese Application No. 2015-238901, filed Dec. 7, 2015. The contents of both applications are hereby incorporated by reference in their entirety.

TECHNICAL FIELD

The present invention relates to a potassium ion secondary battery positive electrode active material.

BACKGROUND ART

Research and development of secondary batteries etc. using lithium ions, sodium ions, magnesium ions, aluminum ions, or the like as carrier ions have been recently drawing attention. From the viewpoint of resource and cost advantages as well as adaptability etc. of a wide variety of novel materials, secondary batteries using other carrier ions have been studied and developed as an actual solution for next-generation, large-sized storage batteries.

Among these, potassium ions, which have a low Lewis acidity and a small Coulomb interaction, have been expected to produce ultrafast chargeable and dischargeable storage batteries. Further, because of the large atomic weight of potassium, potassium-containing materials have a higher true density than lithium-containing materials, and an improvement in energy density per volume can be expected. Moreover, even when dendrites occur in potassium and cause a short circuit, since they are spontaneously dissolved by generated heat and easily eliminate the short circuit, thermal runway is unlikely to occur. Additionally, since potassium does not form an alloy with aluminum, there is no need to use expensive copper as a current collector of the negative electrode side.

Such potassium ion secondary batteries are new subjects of study and are highly expected to be novel storage batteries that will create new industries. As such a potassium ion secondary battery, a potassium ion secondary battery in which Prussian blue (KCuFe(CN)$_6$), which is used as a positive electrode active material, is combined with carbon, which is used as a negative electrode material, has been reported, wherein a high discharge voltage of 3.8 V is attained (NPL 1).

CITATION LIST

Non-Patent Literature

NPL 1: C. D. Wessells et al., Nat. Comm., 2, 550 (2011)
NPL 2: Komaba et al., Electrochem. Commun., 60, 172-175 (2015)

SUMMARY OF INVENTION

Technical Problem

However, since potassium has a large atomic weight and a large ionic radius, the theoretical capacity of a potassium ion secondary battery is likely to be lower than that of a lithium ion secondary battery. As negative electrode materials of potassium ion secondary batteries, Sb, KC$_8$, graphite, etc., are known (NPL 2). In contrast, Prussian blue, mentioned above, is known as a positive electrode active material, but has a low capacity (theoretical charge capacity: about 85 mAhg$^{-1}$; effective capacity: 65 mAhg$^{-1}$ (NPL 1)) when used as a positive electrode active material. Other than Prussian blue, effective positive electrode active materials have not been found.

An object of the present invention is to provide a material other than Prussian blue, the material having high theoretical charge-discharge capacity and being able to be used as a potassium ion secondary battery positive electrode active material.

Solution to Problem

The inventors conducted extensive research to solve the above problems. As a result, they found that when a potassium compound having a specific composition is used as a potassium ion secondary battery positive electrode active material, potassium ions can be inserted and extracted at high potential, and that the potassium compound has high theoretical charge-discharge capacity. Based on this findings, the inventors conducted further research and accomplished the present invention. Specifically, the present invention includes the following.

Item 1. A potassium ion secondary battery positive electrode active material comprising a potassium compound represented by general formula (1): K$_n$MO$_m$, wherein M is copper, iron, or manganese, n is 0.5 to 3.5, and m is 1.5 to 2.5.

Item 2. The potassium ion secondary battery positive electrode active material according to Item 1, wherein the potassium compound has an orthorhombic structure and/or monoclinic structure.

Item 3. The potassium ion secondary battery positive electrode active material according to Item 1 or 2, wherein the potassium compound has a mean particle diameter of 0.2 to 50 μm.

Item 4. A method for producing the potassium ion secondary battery positive electrode active material according to any one of Items 1 to 3, the method comprising a heating step of heating a mixture containing potassium, oxygen, and copper, iron, or manganese.

Item 5. The method according to Item 4, wherein the heating temperature in the heating step is 500 to 1500° C.

Item 6. A potassium ion secondary battery positive electrode comprising the potassium ion secondary battery positive electrode active material according to any one of Items 1 to 3.

Item 7. The potassium ion secondary battery positive electrode according to Item 6, further comprising a conductive material.

Item 8. A potassium ion secondary battery comprising the potassium ion secondary battery positive electrode according to Item 6 or 7.

Advantageous Effects of Invention

The potassium ion secondary battery positive electrode active material of the present invention enables insertion and extraction of potassium ions. In particular, a potassium ion secondary battery using the potassium ion secondary battery positive electrode active material of the present invention is expected to have high capacity and high potential.

Further, since potassium does not form an alloy with aluminum, a potassium ion secondary battery using the potassium ion secondary battery positive electrode active material of the present invention can also use low-cost aluminum rather than expensive copper as a negative electrode current collector.

DESCRIPTION OF EMBODIMENTS

Figure 1:
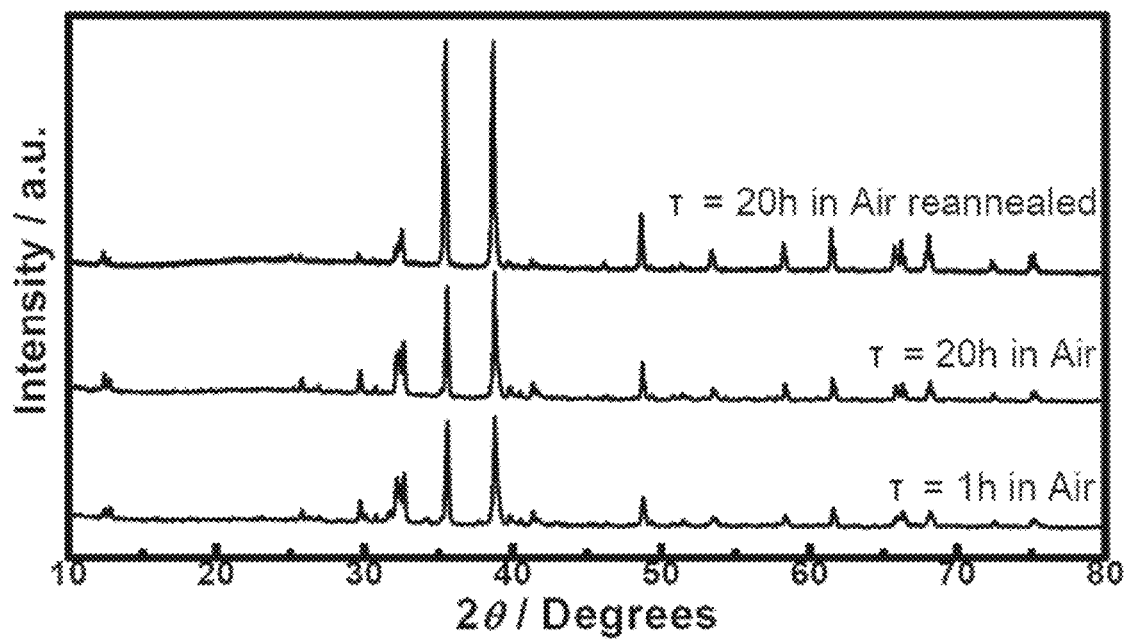
FIG. 1 shows X-ray diffraction patterns of $K_2CuO_2$ obtained in Examples 1-1 to 1-3.

1. Potassium Ion Secondary Battery Positive Electrode Active Material

The potassium ion secondary battery positive electrode active material of the present invention comprises a potassium compound represented by general formula (1): $K_nMO_m$, wherein M is copper, iron, or manganese, n is 0.5 to 3.5, and m is 1.5 to 2.5.

Since such a potassium compound enables insertion and extraction of potassium ions, it is useful as a potassium ion secondary battery positive electrode active material.

In general formula (1), M is copper, iron, or manganese. From the viewpoint of easy potassium ion insertion and extraction, capacity, and high potential, M is preferably copper or manganese.

In general formula (1), n is 0.5 to 3.5, and preferably 0.8 to 2.5 from the viewpoint of easy potassium ion insertion and extraction, capacity, and high potential. m is 1.5 to 2.5, and preferably 1.7 to 2.3 from the viewpoint of easy potassium ion insertion and extraction, capacity, and high potential.

Examples of such potassium compounds represented by general formula (1) include $K_2CuO_2$, $KCuO$, $K_{1.5}CuO_2$, $K_3CuO_2$, $K_3FeO_2$, $K_{1.5}FeO_2$, $K_2FeO_2$, $KFeO_2$, $K_3MnO_2$, $K_{1.5}MnO_2$, $K_2MnO_2$, $KMnO_2$, etc. Among these, from the viewpoint of easy potassium ion insertion and extraction, capacity, and high potential, $K_2CuO_2$, $K_2FeO_2$, $KFeO_2$, $K_2MnO_2$, etc. are preferable, and $K_2CuO_2$, $K_2MnO_2$, etc. are more preferable.

The potassium compound represented by general formula (1) can take any crystal structure, such as an orthorhombic structure or monoclinic structure. In particular, the potassium compound represented by general formula (1) preferably has an orthorhombic structure, monoclinic structure, etc. as a main phase. For example, when M is copper, the monoclinic structure is preferably the main phase; when M is iron, the orthorhombic structure is preferably the main phase; and when M is manganese, the monoclinic structure is preferably the main phase. The amount of the main phase crystal structure present in the potassium compound represented by general formula (1) is not limited and is preferably 80 mol % or more, and more preferably 90 mol % or more based on the entire potassium compound represented by general formula (1). Thus, the potassium compound represented by general formula (1) can be formed of a material having a single phase crystal structure, or a material having another crystal structure, as long as the effect of the present invention is not impaired. The crystal structure of the potassium compound represented by general formula (1) is confirmed by X-ray diffraction measurement.

The potassium compound represented by general formula (1) has diffraction peaks at various positions in the X-ray diffractogram obtained using CuKα radiation. For example, when M is copper, it is preferable that the potassium compound has the strongest peak at a diffraction angle 2θ of 37.5 to 39.9°, the second strongest peak at a diffraction angle 2θ of 34.6 to 36.4°, and peaks at a diffraction angle 2θ of 11.5 to 13.5°, 24.4 to 25.3°, 25.5 to 26.5°, 28.8 to 30.6°, 31.4 to 33.3°, 47.7 to 49.5°, 52.8 to 54.3°, 57.4 to 59.3°, 60.5 to 62.6°, 64.5 to 67.3°, 67.4 to 69.4°, 71.6 to 73.5°, 74.2 to 76.5°, etc. For example, when M is iron, it is preferable that the potassium compound has the strongest peak at a diffraction angle 2θ of 31.0 to 38.6°, the second strongest peak at a diffraction angle 2θ of 17.7 to 20.5°, and peaks at a diffraction angle 2θ of 11.6 to 14.1°, 14.2 to 16.8°, 20.7 to 24.9°, 25.4 to 30.8°, 38.8 to 42.5°, 42.6 to 44.7°, 44.9 to 47.1°, 48.4 to 51.6°, 52.9 to 56.0°, 56.2 to 58.6°, 65.2 to 68.9°, 74.5 to 77.5°, etc. For example, when M is manganese, it is preferable that the potassium compound has the strongest peak at a diffraction angle 2θ of 12.6 to 15.4°, the second strongest peak at a diffraction angle 2θ of 26.8 to 28.8°, and peaks at a diffraction angle 2θ of 15.5 to 18.1°, 18.2 to 19.4°, 20.2 to 22.3°, 22.8 to 24.3°, 28.9 to 29.9°, 30.0 to 31.8°, 32.7 to 37.9°, 41.4 to 50.2°, etc. In the present specification, the strongest peak means the peak with the highest intensity.

From the viewpoint of easy potassium ion insertion and extraction, capacity, and high potential, the mean particle diameter of the potassium compound represented by general formula (1) and having the crystal structure and composition mentioned above is preferably 0.2 to 50 µm, and more preferably 0.5 to 30 µm. The mean particle diameter of the potassium compound represented by general formula (1) is measured by electron microscope (SEM) observation.

In the potassium ion secondary battery positive electrode active material of the present invention, the potassium compound and a carbon material (e.g., carbon black such as acetylene black) may form a composite. The carbon material thereby suppresses the grain growth during firing, which enables obtaining a fine particle potassium ion secondary battery positive electrode active material having excellent electrode properties. In this case, the content of the carbon material in the potassium ion secondary battery positive electrode active material of the present invention is preferably adjusted to 3 to 20 mass %, and particularly preferably 5 to 15 mass %.

The potassium ion secondary battery positive electrode active material of the present invention comprises the potassium compound mentioned above. The potassium ion secondary battery positive electrode active material of the present invention can consist of the potassium compound of the present invention, and can contain inevitable impurities in addition to the potassium compound of the present invention. Examples of such inevitable impurities include starting material compounds explained below. The inevitable impurity can be contained in an amount of about 10 mol % or less, preferably about 5 mol % or less, and even more preferably about 2 mol % or less as long as the effect of the present invention is not impaired.

2. Method for Producing Potassium Ion Secondary Battery Positive Electrode Active Material The potassium ion secondary battery positive electrode active material of the present invention can be obtained, for example, by a production method comprising a heating step of heating a mixture containing potassium, oxygen, and copper, iron, or manganese. The method is explained in detail below.

(1) Starting Material Compound

In the production method of the present invention, a mixture containing potassium, oxygen, and copper, iron, or manganese is subjected to a heating step. The starting material compound for obtaining a mixture containing potassium, oxygen, and copper, iron, or manganese is not limited as long as potassium, oxygen and copper, iron, or manganese are in the end contained in the predetermined ratio in the mixture. Usable examples include potassium-containing compounds, copper-containing compounds, iron-containing compounds, manganese-containing compounds, oxygen-containing compounds, etc.

The types of potassium-containing compounds, copper-containing compounds, iron-containing compounds, manganese-containing compounds, oxygen-containing compounds, etc. are not limited. Four or more compounds each containing a respective element among potassium, copper, iron, manganese, oxygen, and the like can be mixed for use. Alternatively, less than four compounds can be mixed using a compound simultaneously containing two or more elements among potassium, copper, iron, manganese, oxygen, and the like as part of the starting materials.

These starting material compounds are preferably compounds free of metal elements (particularly rare metal elements) other than potassium, copper, iron, manganese, and oxygen. Elements other than potassium, copper, iron, manganese, oxygen, etc., contained in the starting material compounds are preferably extracted or volatized by heating in a non-oxidizing atmosphere mentioned below.

Examples of starting material compounds include the following. Examples of potassium-containing compounds include potassium metal (K); potassium hydroxide (KOH); potassium nitrate ($KNO_3$); potassium chloride (KCl); potassium carbonate ($K_2CO_3$); potassium oxalate ($K_2C_2O_4$); potassium azide ($KN_3$); etc. Examples of copper-containing compounds include copper metal (Cu); copper oxide (CuO); copper hydroxide (CuOH); copper carbonate ($CuCO_3$); copper oxalate ($CuC_2O_4$); etc. Examples of iron-containing compounds include iron metal (Fe); iron oxides, such as iron(II) oxide (FeO) and iron(III) oxide ($Fe_2O_3$); iron hydroxides, such as iron(II) hydroxide ($Fe(OH)_2$) and iron (III) hydroxide ($Fe(OH)_3$); iron carbonates, such as iron(II) carbonate ($FeCO_3$) and iron(III) carbonate ($Fe_2(CO_3)_3$); iron(II) oxalate ($FeC_2O_4$); etc. Examples of manganese-containing compounds include manganese metal (Mn); manganese oxides, such as manganese (II) oxide (MnO) and manganese (IV) oxide ($MnO_2$); manganese hydroxides, such as manganese(II) hydroxide ($Mn(OH)_2$) and manganese(IV) hydroxide ($Mn(OH)_4$); manganese(II) carbonate ($MnCO_3$); manganese(II) oxalate ($MnC_2O_4$); etc. Examples of oxygen-containing compounds include potassium hydroxide (KOH); potassium carbonate ($K_2CO_3$); copper oxide (CuO); copper hydroxide (CuOH); copper carbonate ($CuCO_3$); copper oxalate ($CuCO_4$); iron oxides, such as iron(II) oxide (FeO) and iron(III) oxide ($Fe_2O_3$); iron hydroxides, such as iron(II) hydroxide ($Fe(OH)_2$) and iron(III) hydroxide ($Fe(OH)_3$); iron carbonates, such as iron(II) carbonate ($FeCO_3$) and iron(III) carbonate ($Fe_2(CO_3)_3$); iron(II) oxalate ($FeC_2O_4$); manganese oxides, such as manganese(II) oxide (MnO) and manganese(IV) oxide ($MnO_2$); manganese hydroxides, such as manganese(II) hydroxide ($Mn(OH)_2$) and manganese (IV) hydroxide ($Mn(OH)_4$); manganese(II) carbonate ($MnCO_3$); manganese(I) oxalate ($MnC_2O_4$); etc. Hydrates of these starting material compounds can also be used.

In the present invention, the above starting material compounds may be commercial products, or may be separately synthesized.

The shape of such starting material compounds is not limited. Powders are preferable from the viewpoint of easy handling. From the viewpoint of reactivity, fine particles are preferable, and particularly, powdery particles having a mean particle diameter of 1 µm or less (particularly about 60 to 80 nm) are preferable. The mean particle diameter of the starting material compound is measured by electron microscope observation (SEM).

The mixture containing potassium, oxygen, and copper, iron, or manganese can be obtained by mixing necessary materials among the starting material compounds explained above.

The mixing ratio of the starting material compounds is not limited. It is preferable to mix the starting material compounds so as to obtain the composition of a potassium compound, which is the final product. The mixing ratio of the starting material compounds is preferably such that the ratio of elements contained in the starting material compounds corresponds to the ratio of the elements in the target composite oxide. Specifically, from the viewpoint of easy potassium ion insertion and extraction, capacity, and high potential, it is preferable that the ratio of potassium to at least one member selected from the group consisting of copper, iron, and manganese is 30 to 80 mol %:20 to 70 mol %, and more preferably 40 to 70 mol %:30 to 60 mol %.

(2) Production Method

The mixing method for producing a mixture containing potassium, oxygen, and copper, iron, or manganese is not limited. A method that is capable of uniformly mixing starting material compounds can be used. Examples include mortar mixing, mechanical milling, coprecipitation, a method in which components are dispersed in a solvent and then mixed, and a method in which components are mixed by dispersing them in a solvent at once, etc. Of these, the potassium compound of the present invention can be obtained in easy manner by mortar mixing. Coprecipitation can be used for obtaining a more uniform mixture.

Mixing and heating can be performed in any atmosphere. For example, mixing and heating can be performed in air or in an inert gas atmosphere, such as argon or nitrogen. Mixing and heating can be also performed under reduced pressure, such as in a vacuum.

The heating temperature in the heating treatment of the mixture containing potassium, oxygen, and copper, iron, or manganese is preferably 500 to 1500° C., more preferably 600 to 1300° C., and even more preferably 700 to 1000° C. from the viewpoint of easy operation and improvement in crystallinity and electrode characteristics (particularly, capacity and potential) of the resulting potassium compound. The heating time is not limited and is preferably 10 minutes to 48 hours, and more preferably 30 minutes to 24 hours.

3. Potassium Ion Secondary Battery Positive Electrode and Potassium Ion Secondary Battery In the potassium ion secondary battery positive electrode and the potassium ion secondary battery according to the present invention, the potassium ion secondary battery positive electrode active material of the present invention is used as a positive active material, and other basic structures can be formed by referring to known nonaqueous electrolyte lithium ion secondary battery positive electrodes and non-aqueous electrolyte lithium ion secondary batteries. For example, a positive electrode, negative electrode, and separator can be arranged in a battery container in such a manner that the positive electrode is isolated from the negative electrode by the separator. Subsequently, the battery container is filled with a nonaqueous electrolyte solution, and then sealed, thus producing the potassium ion secondary battery of the present invention. The potassium ion secondary battery used in the present invention may be a potassium secondary battery. In this specification, "potassium ion secondary battery" means a secondary battery in which potassium ions are carrier ions, and "potassium secondary battery" means a secondary battery in which potassium metal or potassium alloy is used as a negative electrode active material.

The positive electrode can take a structure in which a positive electrode material containing the potassium ion secondary battery positive electrode active material of the present invention is supported on a positive electrode current collector. For example, the positive electrode can be produced by applying a positive electrode mixture containing the potassium ion secondary battery positive electrode active material of the present invention, a conductive material, and optionally a binder to a positive electrode current collector.

Examples of conductive materials include acetylene black, Ketjenblack, carbon nanotube, vapor-grown carbon fibers, carbon nanofibers, graphite, corks, and like carbon materials. The shape of the conductive material is not limited, and powders, for example, can be used.

Examples of binders include fluororesins, such as polyvinylidene fluoride resin and polytetrafluoroethylene.

The contents of components in the positive electrode material are not limited and can be suitably determined. For example, it is preferable that the potassium ion secondary battery positive electrode active material of the present invention is contained in an amount of 50 to 95 vol % (particularly, 70 to 90 vol %), the conductive material is contained in an amount of 2.5 to 25 vol % (particularly, 5 to 15 vol %), and the binder is contained in an amount of 2.5 to 25 vol % (particularly 5 to 15 vol %).

Examples of materials composing the positive electrode current collector include aluminum, platinum, molybdenum, stainless steel, etc. Examples of the shape of the positive electrode current collector include a porous body, foil, plate, mesh formed of fiber, etc.

It is preferable that the application amount of the positive electrode material relative to the positive electrode current collector is suitably determined in accordance with the use etc. of the potassium ion secondary battery.

Examples of negative electrode active materials composing the negative electrode include potassium metal; silicon; silicon-containing Clathrate compounds; potassium alloy; ternary or quaternary oxides represented by $M^1M^2_2O_4$ ($M^1$: Co, Ni, Mn, Sn, etc. $M^2$: Mn, Fe, Zn, etc.); metal oxides represented by $M^3_3O_4$ ($M^3$: Fe, Co, Ni, Mn, etc.), $M^4_2O_3$ ($M^4$: Fe, Co, Ni, Mn, etc.), $M_nV_2O_6$, $M^4O_2$ ($M^4$: Sn, Ti, etc.), $M^2O$ ($M^2$: Fe, Co, Ni, Mn, Sn, Cu, etc.), etc.; graphite, hard carbon, soft carbon, graphene; carbon materials mentioned above; Lepidocrocite-type $K_{0.8}Li_{0.2}Ti_{1.67}O_4$; $KC_8$; $KTi_3O_4$; $K_2Ti_6O_{13}$; $K_2Ti_nO_{2n+1}$ (n=3, 4, 6, 8); $K_2SiP_2$; $KSi_2P_3$; $MnSnO_3$; $K_{1.4}Ti_8O_{16}$; $K_{1.5}Ti_{6.5}V_{1.5}O_{16}$; $K_{1.4}Ti_{6.6}Mn_{1.5}O_{16}$; $Zn_3(HCOO)_6$; $Co_3(HCOO)_6$; $Zn_{1.5}Co_{1.5}(HCOO)_6$; $KVMoO_6$; $AV_2O_6$ (A=Mn, Co, and Ni, Cu); $Mn_2GeO_4$; $Ti_2(SO_4)_3$; $KTi_2(PO_4)_3$; $SnO_2$; $Nb_2O_5$; $TiO_2$; Te; $VOMoO_4$; $TiS_2$; $TaS_2$; $MoSe_2$; $SnSe_2$; $SnS_2$; $SnO_2$; $Sb_2O_3$; $NiCo_2S_4$; $Sb_2O_4$; $Ni_3S_2$; FeS; $Nb_2O_5$; $K_{0.3}MoO_2$; $K_2Ti_3O_7$; $K_2Ti_2O_5$; $Fe_3O_4$; $Fe_2O_3$; $Co_3O_4$; CuO; Sb; Ge; P; $TiO_2$; $KTiO_2$; SnSb; organic-based compounds, such as polyacethylene (PAc), polyanthracene, polyparaphenylene (PPP), 1,4-benzene dicarboxylate (BDC), polyaniline (Pan), polypyrrole (PPy) polythiophene (PTh), tetraethyithiuram disulfide (TETD), poly(2,5-dimercapto-1,3,4-thiadiazole) (PDMcT), poly(2,2'-dithiodianyline) (PDTDA), poly(5,8-dihydro-1H,4H-2,3,6,7-tetrathia-anthracene) (PDTTA), poly(2,2,6,6-tetramethylpiperidine-1-oxyl-4-yl methacrylate) (PTMA), $K_2C_6H_4O_4$, $K_2C_{10}H_2O_4$, $K_2C_5O_5.2H_2O$, $K_4C_8H_2O_6$, $K_2C_6H_4O_4$, $K_2C_{10}H_2O_4$, $K_2C_{14}H_6O_4$, $K_4C_6O_6$, $K_4C_{24}H_8O_8$, $K_4C_6O_6$, $K_2C_6O_6$, $K_2C_6H_2O_4$, $K_2C_{14}H_6O_4$, $K_2C_8H_4O_4$, $K_2C_{14}H_4N_2O_4$, $K_2C_6H_4O_4$, $K_2C_{18}H_{12}O_8$, $K_2C_{16}H_8O_4$, and $K_2C_{10}H_2N_2O_4$; etc. Examples of potassium alloys include alloys containing potassium and aluminum as constituent elements, alloys containing potassium and zinc as constituent elements, alloys containing potassium and manganese as constituent elements, alloys containing potassium and bismuth as constituent components, alloys containing potassium and nickel as constituent elements, alloys containing potassium and antimony as constituent elements, alloys containing potassium and tin as constituent elements, and alloys containing potassium and indium as constituent elements; quaternary layered carbon or nitrogen compounds, such as MXene-based alloys comprising metal (scandium, titanium, vanadium, chromium, zirconium, niobium, molybdenum, hafnium, tantalum, etc.) and carbon as constituent elements, $M^5_xBC_3$-based alloys ($M^5$: scandium, titanium, vanadium, chromium, zirconium, niobium, molybdenum, hafnium, tantalum, etc.), etc.; alloys containing potassium and lead as constituent elements; etc.

The negative electrode can be formed of a negative electrode active material or can take a structure in which a negative electrode material containing a negative electrode active material, a conductive material, and optionally a binder is supported on a negative electrode current collector. When the structure in which a negative electrode material is supported on a negative electrode current collector is taken, a negative electrode mixture containing a negative electrode active material, a conductive material, and optionally a binder is applied to a negative electrode current collector, thus producing a negative electrode.

When a negative electrode is formed of a negative electrode active material, the negative electrode active material mentioned above can be formed into a shape (e.g., plate) that is suitable for the electrode.

When the structure in which a negative electrode material is supported on a negative electrode current collector is used, the types of the conductive material and binder, and the contents of the negative electrode active material, conductive material, and binder, are the same as those mentioned for the positive electrode. Examples of materials composing the negative electrode current collector include aluminum, copper, nickel, stainless steel, etc. Of these, since potassium does not form an alloy with aluminum, a low-cost aluminum negative electrode current collector can be used rather than an expensive copper negative electrode current collector. Examples of the shape of the negative electrode current collector include a porous body, foil, plate, mesh formed of fiber, etc. It is preferable that the application amount of the negative electrode material relative to the negative electrode current collector is suitably determined in accordance with the use etc. of the potassium ion secondary battery.

Any separator can be used as long as the separator is made of a material capable of isolating the positive electrode and the negative electrode in a battery, and retaining an electrolyte solution to ensure ion conductivity between the positive electrode and the negative electrode. Examples of separators include materials in the form of a porous film, non-woven fabric, and woven fabric that are made of polyolefin resin, such as polyethylene, polypropylene, polyimide, polyvinyl alcohol, and terminated amino polyethylene oxide; fluororesin, such as polytetrafluoroethylene; acrylic resin; nylon; aromatic aramid; inorganic glass; ceramics; etc.

Nonaqueous electrolyte solutions preferably contain potassium ions. Examples of such electrolyte solutions include potassium salt solutions, ion liquids formed of a potassium-containing inorganic material, etc.

Examples of potassium salts include potassium inorganic salt compounds, such as potassium halides (e.g., potassium chloride, potassium bromide, and potassium iodide), potassium perchlorate, potassium tetrafluoroborate, potassium hexafluorophosphorate, and potassium hexafluoroarsenate; potassium organic salt compounds, such as potassium bis (trifluoromethylsulfonyl)imide, potassium bis(perfluoroethanesulfony)imide, potassium benzoate, potassium salicylate, potassium phthalate, potassium acetate, potassium propionate, and Grignard reagent; etc.

Examples of solvents include carbonate compounds, such as propylene carbonate, ethylene carbonate, dimethyl carbonate, ethylmethyl carbonate, and diethyl carbonate; lactone compounds such as γ-butyrolactone and γ-valerolactone; ether compounds, such as tetrahydrofuran, 2-methyltetrahydrofuran, diethylether, diisopropyl ether, dibutyl ether, methoxy methane, N,N-dimethylformamide, glyme, N-propyl-N-methyl pyrrolidinium bis(trifluoromethane sulfonyl)imide, dimethoxyethane, dimethoxymethane, diethoxymethane, diethoxyethane, and propyleneglycol dimethyl ether; acetonitrile; etc.

A solid electrolyte can also be used in place of the nonaqueous electrolyte solution. Examples of solid electrolytes include potassium ion conductors, such as $KH_2PO_4$, $KZr_2(PO_4)_3$, $K_9Fe(MoO_4)_6$, $K_4Fe_3(PO_4)_2P_{27}$, and $K_3MnTi(PO_4)_3$.

Because of the use of the potassium ion secondary battery positive electrode active material of the present invention, the potassium ion secondary battery of the present invention ensures higher potential and energy density in an oxidation reduction reaction (charge-discharge reaction), and moreover, it is highly safe and useful. Accordingly, the potassium ion secondary battery of the present invention is, for example, suitably used in devices that are desired to have a smaller size and higher performance.

EXAMPLES

The present invention is explained in detail below with reference to Examples and Comparative Examples. The present invention is, needless to say, not limited to these.

The following reagents were used in the Examples.
$K_2CO_3$ (produced by Rare Metallic Co., Ltd., 99.9% (3N))
CuO (produced by Kojundo Chemical Laboratory Co., Ltd., 99.99% (4N))
FeO (produced by Wako Pure Chemical Industries, Ltd., 99.5%)
$FeC_2O_4 \cdot 2H_2O$ (produced by Junsei Chemical Co., Ltd., 99.9% (3N))
$MnC_2O_4$ (produced by Kojundo Chemical Laboratory Co., Ltd., 99.9% (3N)).

Measurement of Powder X-Ray Diffraction (XRD)

Synthesized samples were measured using an X-ray diffractometer (RINT-Ultima III/G, produced by Rigaku Corporation). The X radiation source used was CuKα radiation, the applied voltage was 40 kV, and the electric current was 40 mA. The measurement was performed at a scan speed of 0.02°/sec in an angle range of 10 to 80°.

Example 1: $K_nCuO_2$

Example 1-1

$K_2CO_3$ and CuO were used as starting material powders. Synthesis operation was performed in a dry room to prevent water absorption of $K_2CO_3$. $K_2CO_3$ and CuO were weighed so that the molar ratio of potassium:copper was 2:1, and mixed in an agate mortar for about 30 minutes. The mixture was formed into pellets and fired in an electric furnace in air at 800° C. for 1 hour. The pellets were fired again at 800° C. for 20 hours in an electric tubular furnace. As a sample preparation method for avoiding the influence of the air exposure due to the hygroscopicity of the resulting product, the product obtained after firing was placed in a glove box in which an Ar atmosphere was maintained, and stored in a non-contact environment with air. The product ($K_2CuO_2$) was confirmed by X-ray diffraction measurement.

Example 1-2

The same treatment as in Example 1-1 was performed except that refiring was not performed. It was confirmed from the X-ray diffraction pattern that the resulting product ($K_2CuO_2$) was the same as the product obtained in Example 1-1.

Example 1-3

The same treatment as in Example 1-1 was performed except that refiring was not performed and the firing time was changed to 20 hours. It was confirmed from the X-ray diffraction pattern that the resulting compound ($K_2CuO_2$) was the same as the product obtained in Example 1-1.

Regarding $K_2CuO_2$ obtained in Examples 1-1 to 1-3, X-ray diffraction patterns obtained by powder X-ray diffraction are shown in FIG. 1. The results indicate that the resulting $K_2CuO_2$ crystals have the strongest peak at a diffraction angle 2θ of 38.0 to 39.4°, the second strongest peak at a diffraction angle 2θ of 35.1 to 35.9°, and peaks at a diffraction angle 2θ of 12.0 to 13.0°, 24.9 to 25.3°, 25.5 to 26.0°, 29.3 to 30.1°, 31.9 to 32.8°, 48.2 to 49.0°, 53.3 to 53.8°, 57.9 to 58.8°, 61.0 to 62.1°, 65.0 to 67.0°, 67.7 to 68.9°, 72.1 to 73.0°, and 74.7 to 76.0°. The results reveal that the resulting $K_2CuO_2$ crystals have a monoclinic structure, that the lattice constants are a=6.925 Å, b=3.342 Å, c=14.459 Å, and β=91.6°, and the unit lattice volume (V) is 334.5 Å$^3$. β and V respectively represent the degree and volume of the lattice constants. The lattice constant parameters a, b, and c have an error of 0.1 Å or less, and β has an error of 15° or less. The element composition of the crystals was examined by EDX analysis shown in FIG. 2, and found to be $K_{1.8}CuO_2$. Additionally, the results obtained by analyzing the elements of the resulting sample by the ICP-AES method also confirmed that the atomic weights of K and Cu were 33.8 (1.8 mol mass) and 30.3 (1.00 mol mass), and that $K_{1.8}CuO_2$ was obtained.

Figure 2:
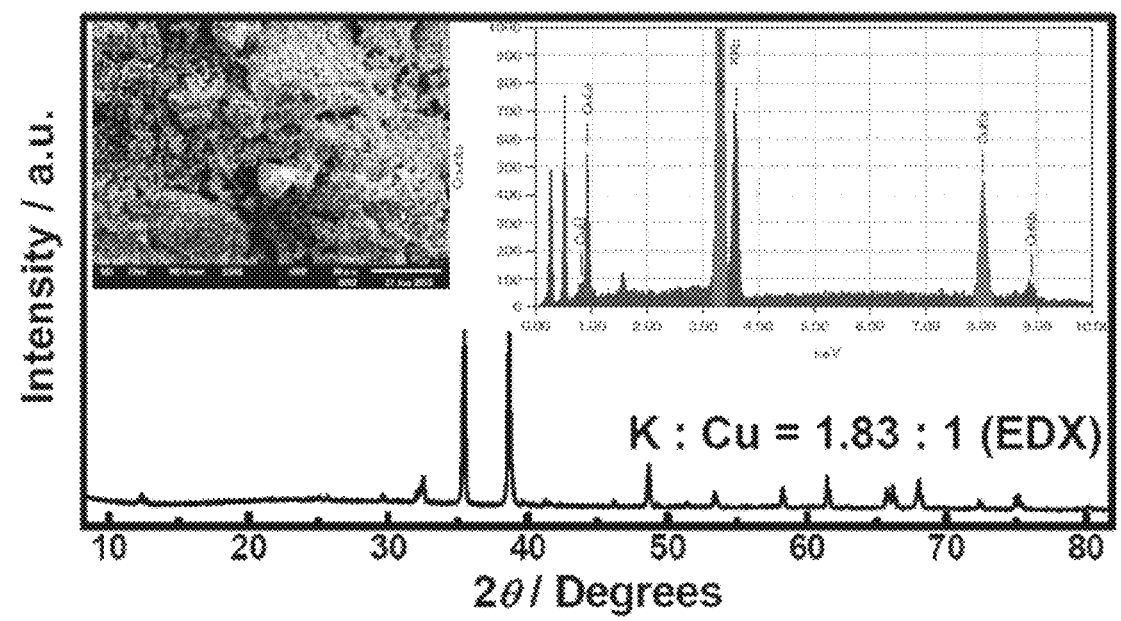
FIG. 2 shows the results of SEM-EDX of $K_2CuO_2$ obtained in Example 1-1.

$K_2CuO_2$ obtained in Example 1-1 was observed using a scanning electron microscope. FIG. 2 shows the results. The scale bar in FIG. 2 is 0.5 μm. The results shown in FIG. 2 reveal that $K_2CuO_2$ having a particle diameter of approximately 10 μm is obtained.

Test Example 1: Examination of Potassium Extraction/Insertion (Li Half Cell)

To perform charge-discharge measurement, $K_2CuO_2$ obtained in Example 1-1, polyvinylidene fluoride (PVDF), and acetylene black (AB) were mixed in an agate mortar in a mass ratio of 85:7.5:7.5. The resulting slurry was applied to aluminum foil (thickness: 20 μm), which was a positive electrode current collector, and the resultant was punched into a circle (diameter: 8 mm) to obtain a positive electrode. Further, pressure bonding was performed at 30 to 40 MPa so that the sample was not separated from the positive electrode current collector.

Metal lithium punched with a diameter of 14 mm was used as a negative electrode, and two pieces of porous Celgard 2500 cut out with a diameter of 18 mm were used as separators. An electrolyte solution (Kishida Chemicals) in which $LiPF_6$ was dissolved as a supporting electrolyte at a concentration of 1 mol dm$^{-3}$ in a solvent containing ethylene carbonate (EC) and diethyl carbonate (DEC) in a volume ratio of 1:2 was used. The battery was produced in a glove box in an Ar atmosphere because metal lithium was used and any mixing of water with the electrolyte solution that happened became a factor of increasing the resistance increment. The Cr2032 coin cell shown in FIG. 3 was used as a cell. Constant-current, charge-discharge measurement was performed using a voltage switching device by setting the electric current to 15 mAhg$^{-1}$, the maximum voltage to 4.5 V, and the minimum voltage to 1.5 V, and by starting with a charge. The charge-discharge measurement was performed with the cell in a 55° C. thermostat bath. As shown in FIG. 4, the results indicate that the open-circuit voltage of the $K_2CuO_2$ sample is about 3.15 V. This value is about 3.05 V vs. K$^+$ as calculated based on the potassium potential. This material is therefore expected to be a high-potential positive electrode material.

Figure 5:
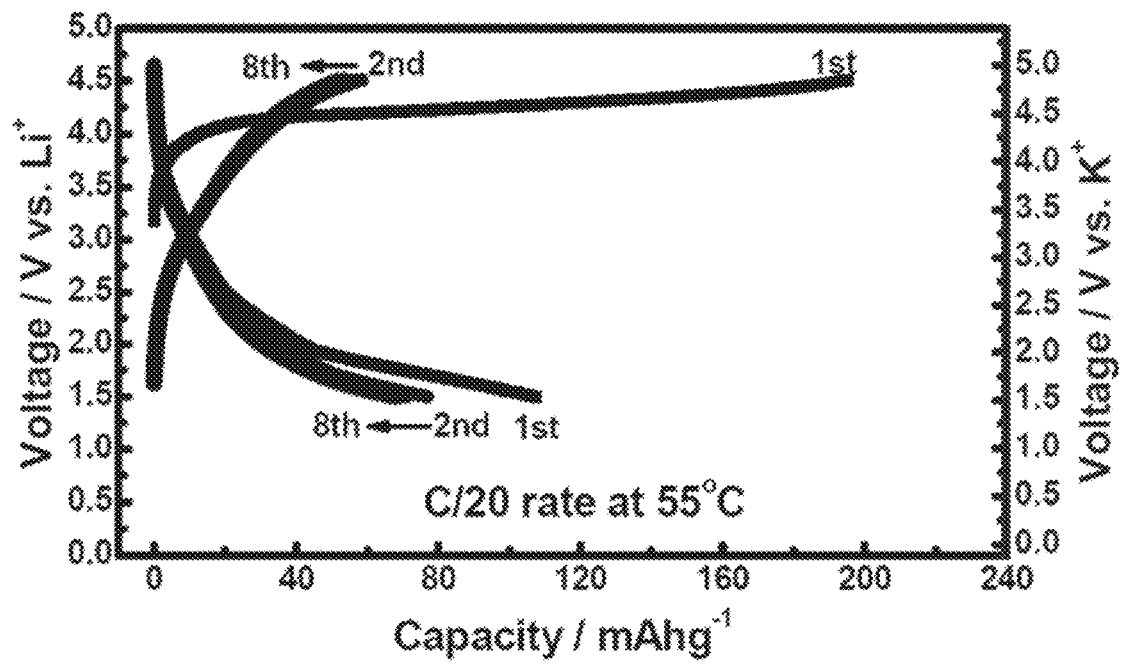
FIG. 5 is a graph showing the charge-discharge test results of Test Example 1.

Subsequently, the results of charge-discharge characteristics (relationship between each cycle and discharge capacity) obtained by the use of the resulting $K_2CuO_2$ are shown in FIG. 5. The results of FIG. 5 indicate that the initial drawing capacity (charge capacity) is 210 mAhg$^{-1}$, and the resulting positive material is expected to be a high capacity material. Additionally, the theoretical capacity is about 308 mAhg$^{-1}$.

Test Example 2: Examination of Potassium Ion Extraction/Insertion (Potassium Ion Secondary Battery)

Figure 3:
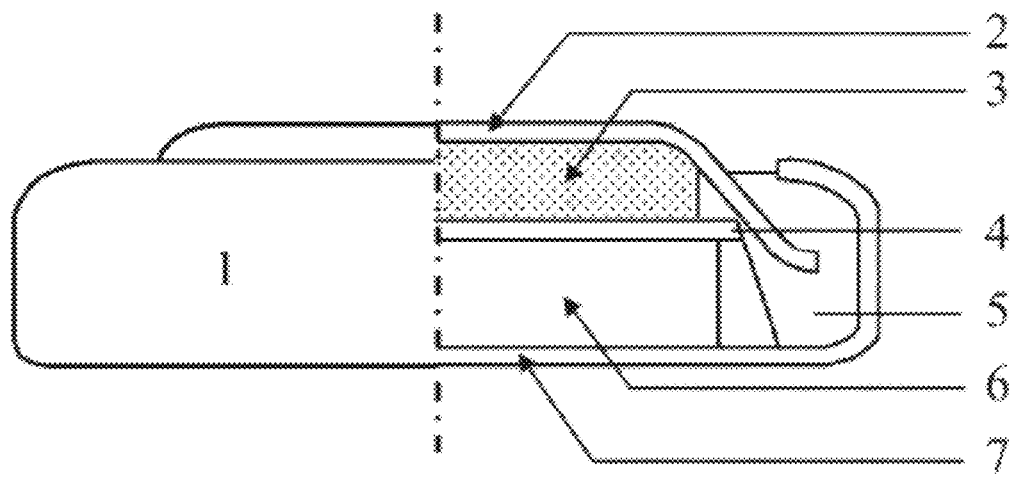
FIG. 3 shows a sectional view of a test cell obtained in Test Example 1 or 2.
Figure 4:
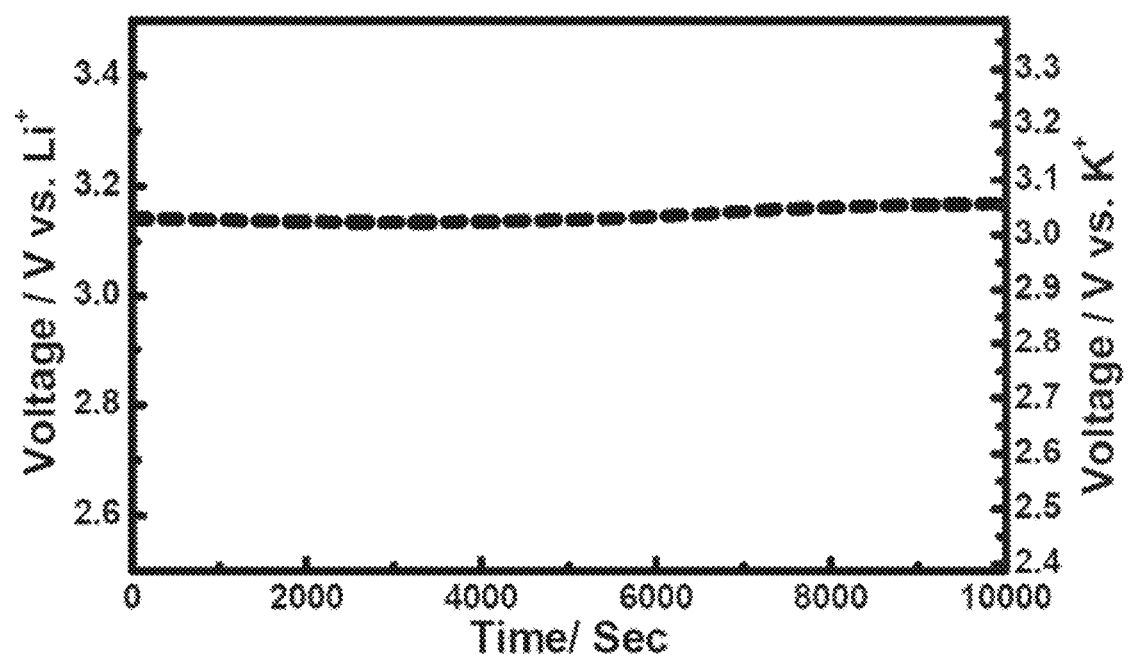
FIG. 4 is a graph showing the open-circuit potential measurement results of Test Example 1.
Figure 6:
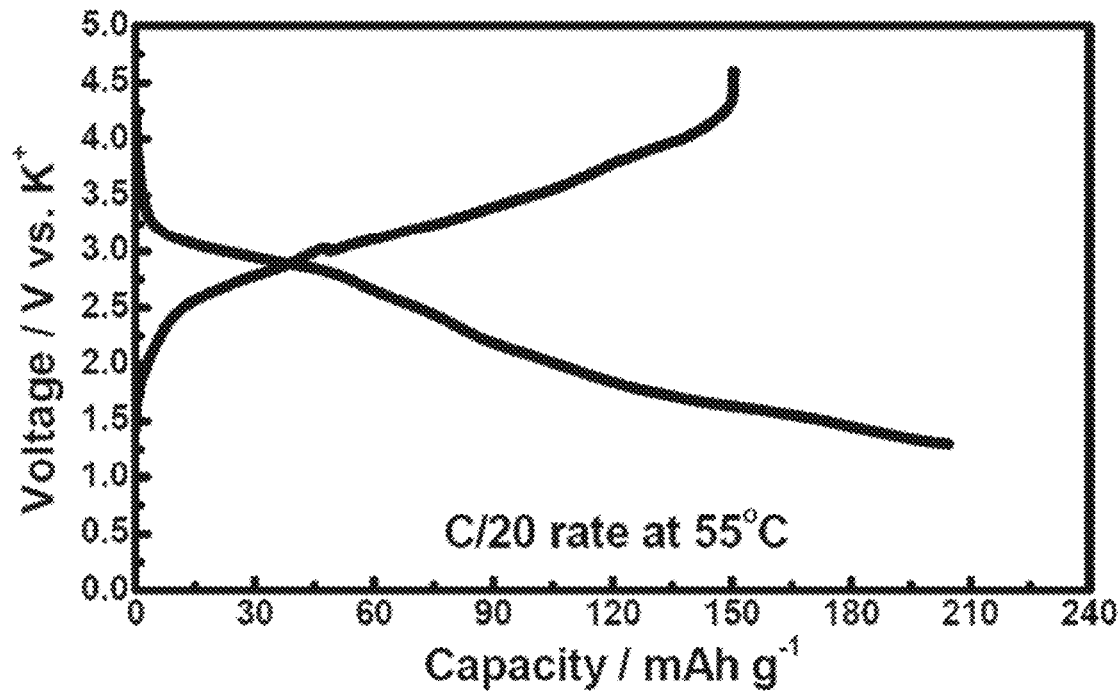
FIG. 6 is a graph showing the charge-discharge test results of Test Example 2-1.

The CR2032 coin cell shown in FIG. 3 was used as a cell. Natural graphite was used as a negative electrode. Potassium bis trifluoromethane sulfonyl imide (KTFSI) or potassium hexafluorophosphate ($KPF_6$) was used as an electrolyte, and an electrolyte solution obtained by dissolving KTFSI or $KPF_6$ at a concentration of 1M (mol dm$^{-3}$) in a propylene carbonate (PC) solvent was used. Constant-current, charge-discharge measurement was performed using a voltage switching device by setting the electric current to 15 mAg$^{-1}$, the maximum voltage to 4.8 V, and the minimum voltage to 1.3 V, and by starting with a charge. The charge-discharge measurement was performed with the cell in a 55° C. thermostat bath. In order to avoid the influence of the air exposure due to the hygroscopicity of the potassium-containing compound, the means for producing a battery etc. was performed in a glove box in which an Ar atmosphere was maintained. FIG. 6 shows the results. The results indicate that the initial drawing capacity (charge capacity) is 150 mAhg$^{-1}$, and that the average voltage is about 3 V. The resulting positive active material is expected to be an active material with high capacity and high potential. The theoretical capacity obtained by the extraction and insertion of K$^+$ is about 308 mAhg$^{-1}$.

Example 2: $K_nFeO_2$

Example 2-1

$K_2CO_3$ and FeO were used as starting material powders. Synthesis operation was performed in a dry room to prevent water absorption of $K_2CO_3$. $K_2CO_3$ and FeO were weighed so that the molar ratio of potassium:iron was 1:1, and mixed in an agate mortar for about 30 minutes. The mixture was formed into pellets and fired in an electric furnace in air at 800° C. for 1 hour. Further, the pellets were fired again at 800° C. for 24 hours in an electric tubular furnace. As a sample preparation method for avoiding the influence of the air exposure due to the hygroscopicity of the resulting product, the product obtained after firing was placed in a glove box in which an Ar atmosphere was maintained, and stored in a non-contact environment with air. The product ($KFeO_2$) was confirmed by X-ray diffraction measurement.

Figure 7:
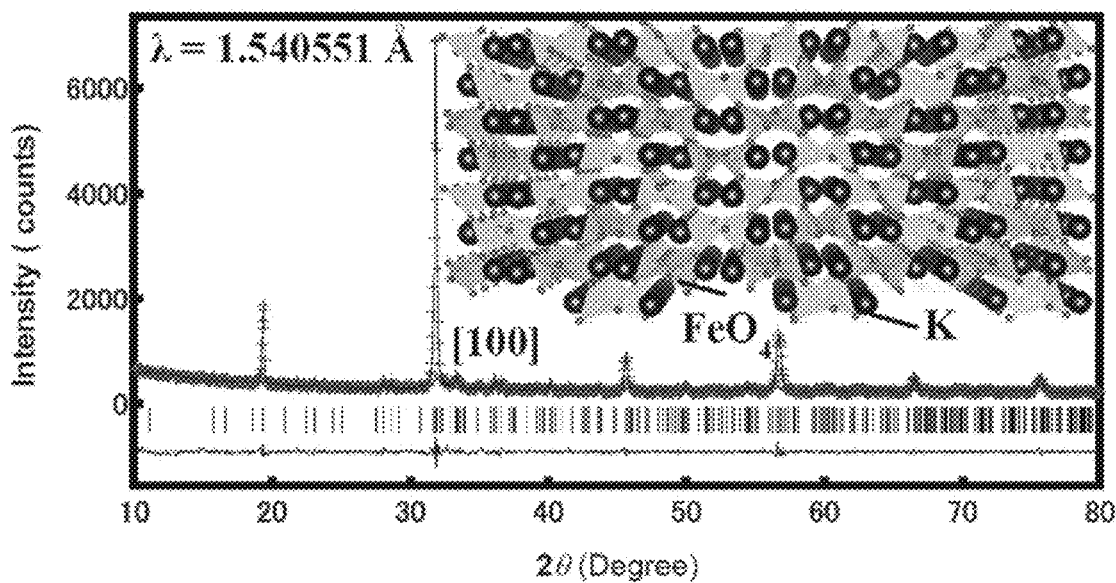
FIG. 7 shows an X-ray diffraction pattern of $KFeO_2$ obtained in Example 2-1.

Regarding $KFeO_2$ obtained in Example 2-1, an X-ray diffraction pattern obtained by powder X-ray diffraction is shown in FIG. 7. The results indicate that the resulting $KFeO_2$ crystals have the strongest peak at a diffraction angle 2θ of 31.2 to 38.4°, the second strongest peak at a diffraction angle 2θ of 18.2 to 20.1°, and peaks at a diffraction angle 2θ of 12.1 to 13.8°, 14.5 to 16.3°, 21.1 to 24.4°, 25.9 to 30.6°, 39.0 to 42.3°, 42.8 to 44.4°, 45.2 to 46.6°, 48.9 to 51.1°, 53.4 to 56.0°, 56.2 to 58.1°, 65.7 to 68.4°, and 74.9 to 77.0°.

As a result, because all of the Bragg peaks of the sample synthesized by the solid phase method were indexed in the monoclinic lattice, and the presence of the impurity phase, which was observed in starting materials or the products therefrom, was not confirmed, the resulting sample was confirmed to be single-phase $KFeO_2$. The results of XRD also indicate that $KFeO_2$ belongs to the orthorhombic crystal system and the space group Pbca (No. 61). The lattice constants obtained according to the Rietveld method (a=5.5942(6) Å, b=11.2839(10) Å, c=15.8584(15) Å, α=β=γ=90°) correspond to the values in the literature (A. Moeller, Zeitschrift fuer Anorganische und Allgemeine Chemie (1950) (DE) (2001)627, pp. 2537-2541). The reliability factors were such that $R_{wp}$=5.74%, $R_p$=4.28%, and $x^2$=1.24. The element composition in the crystals was examined by EDX analysis, and the EDX analysis confirmed that $K_{0.87}FeO_2$ was obtained. Additionally, the elements of the sample by were analyzed by the ICP-AES method. As a result, the atomic weights of K and Fe were 28.4 (0.914 mol mass) and 44.4 (1.00 mol mass), and the ICP-AES method confirmed that $K_{0.91}FeO_2$ was obtained. In the $KFeO_2$ crystal structure shown in FIG. 7, adjacent $FeO_4$ tetrahedrons are connected via oxygen at the top to form a structure similar to that of cristobalite. In addition to $KFeO_2$, $KMO_2$ (M=Cr, Co, Ni, Mn, Cu, or like transition metals)-based or $K_xMF_y$, (x=0.25, 0.50, 0.58, 0.59, 0.60, 1.0, or 2.0; y=3, 4, or 5)-based compounds have a structure similar to that of cristobalite.

Figure 8:
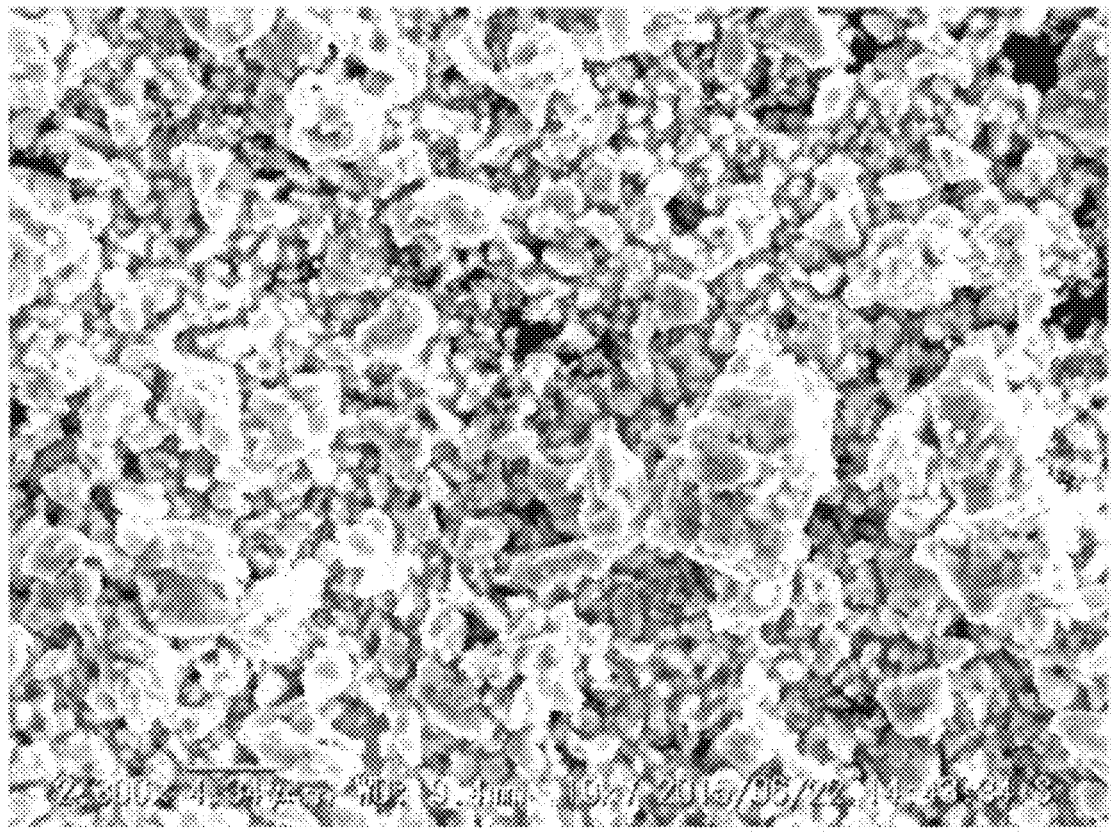
FIG. 8 is an SEM image of $KFeO_2$ obtained in Example 2-1.

$KFeO_2$ obtained in Example 2-1 was observed using a scanning electron microscope. FIG. 8 shows the results. The scale bar in FIG. 8 is 4.34 μm. The results shown in FIG. 8 reveal that $KFeO_2$ having a particle diameter of approximately 0.2 to 20 μm is obtained.

Example 2-2

$K_2CO_3$ and $Fe_2O_3$ were used as starting material powders. Synthesis operation was performed in a dry room to prevent water absorption of $K_2CO_3$. $K_2CO$ and $Fe_2O_3$ were weighed so that the molar ratio of potassium:iron was 1:1, and mixed in an agate mortar for about 30 minutes. The mixture was formed into pellets and fired in an electric furnace in air at 800° C. for 1 hour. Further, the pellets were fired again at 800° C. for 36 hours in an electric tubular furnace. As a sample preparation method for avoiding the influence of the air exposure due to the hygroscopicity of the resulting product, the product obtained after firing was placed in a glove box in which an Ar atmosphere was maintained, and stored in a non-contact environment with air. The product ($KFeO_2$) was confirmed by X-ray diffraction measurement.

Figure 9:
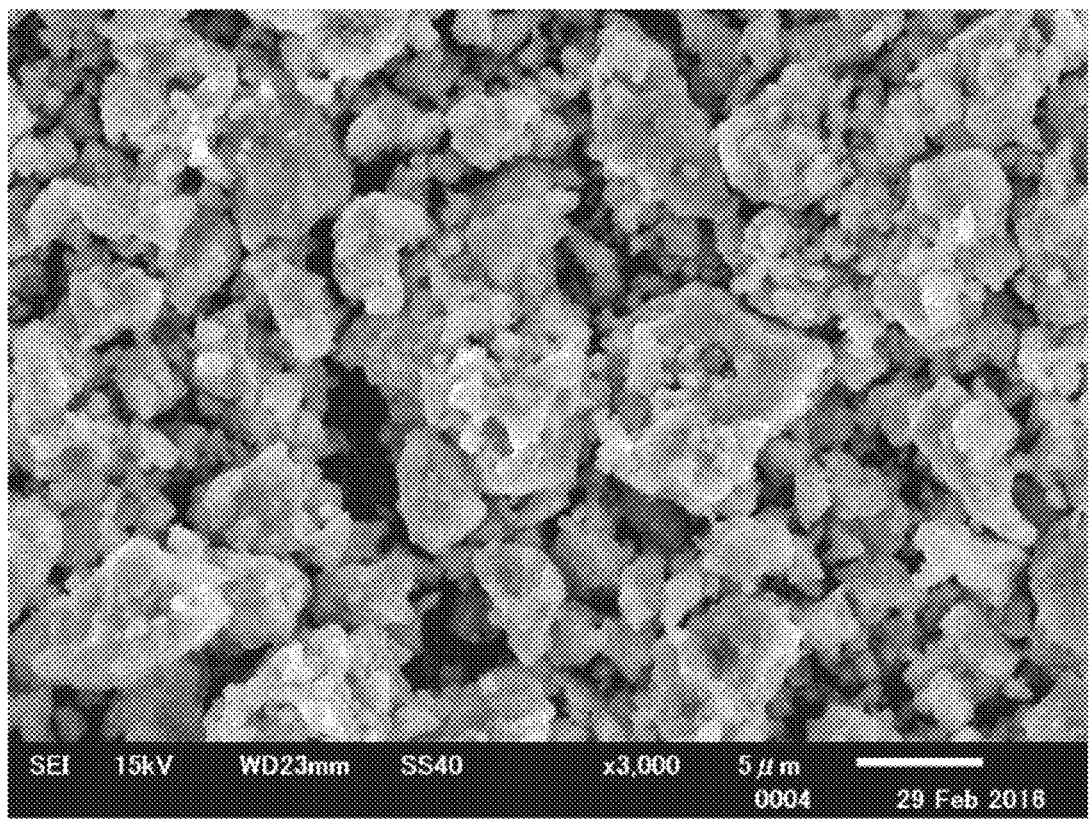
FIG. 9 is an SEM image of $KFeO_2$ obtained in Example 2-2.
Figure 10:
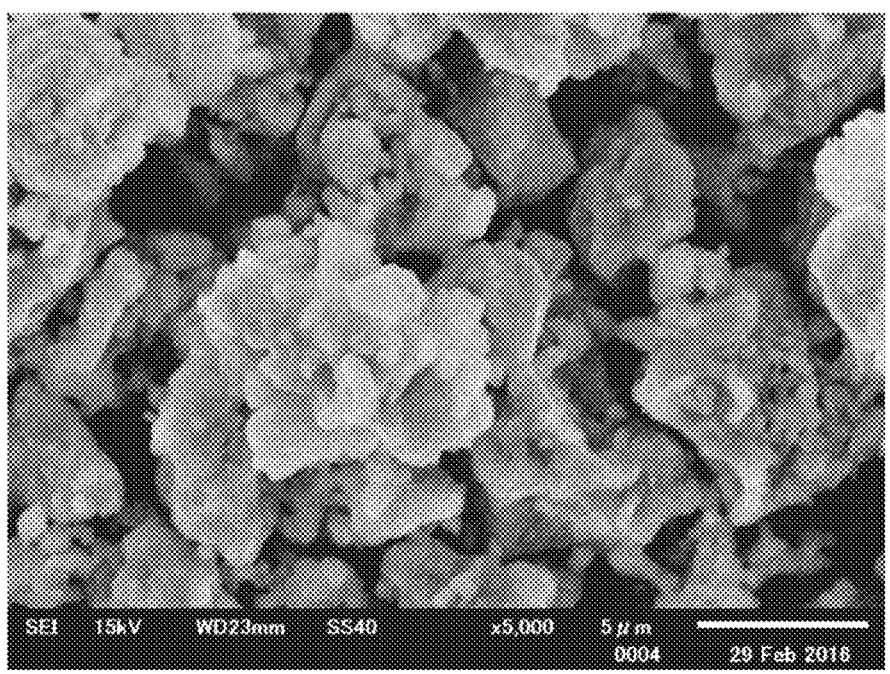
FIG. 10 is a high-resolution SEM image of $KFeO_2$ obtained in Example 2-2.
Figure 10:
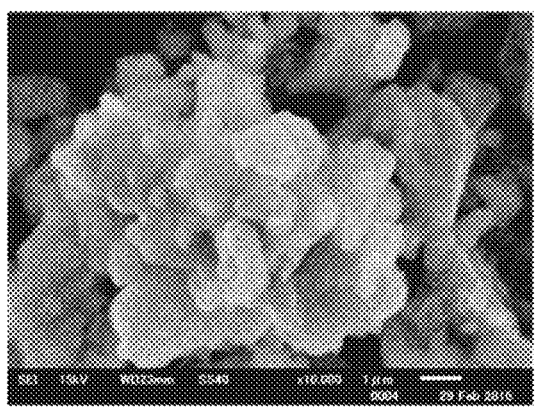

The elements were analyzed by EDX as in Example 2-1. As a result, it was confirmed that $F_{0.85}FeO_2$ was obtained. Further, $K_{0.85}FeO_2$ obtained in Example 2-2 was observed using a scanning electron microscope and a high-resolution scanning electron microscope. FIGS. 9 and 10 show the results. The results shown in FIGS. 9 and 10 reveal that $K_{0.85}FeO_2$ having a particle diameter of approximately 7 μm is obtained.

Example 2-3

$K_2CO_3$ and $FeC_2O_4 \cdot 2HO$ were used as starting material powders. Synthesis operation was performed in a dry room to prevent water absorption of $K_2CO_3$. $K_2CO_3$ and $FeC_2O_4 \cdot 2H_2O$ were weighed so that the molar ratio of potassium:iron was 2:1, and mixed in an agate mortar for about 30 minutes. The mixture was formed into pellets and fired in an electric furnace in air at 800° C. for 1 hour. As a sample preparation method for avoiding the influence of the air exposure due to the hygroscopicity of the resulting product, the product obtained after firing was placed in a glove box in which an Ar atmosphere was maintained, and stored in a non-contact environment with air. The product ($K_2FeO_2$) was confirmed by X-ray diffraction measurement.

The results of the powder X-ray diffraction of $K_2FeO_2$ obtained in Example 2-3 indicate that the resulting $K_2FeO_2$ crystals have the strongest peak at a diffraction angle 2θ of 31.2 to 38.4°, the second strongest peak at a diffraction angle 2θ of 18.2 to 20.1°, and peaks at a diffraction angle 2θ of 12.1 to 13.8°, 14.5 to 16.3°, 21.1 to 24.4°, 25.9 to 30.6°, 39.0 to 42.3°, 42.8 to 44.4°, 45.2 to 46.6°, 48.9 to 51.1°, 53.4 to 56.0°, 56.2 to 58.1°, 65.7 to 68.4°, and 74.9 to 77.0°.

Figure 11:
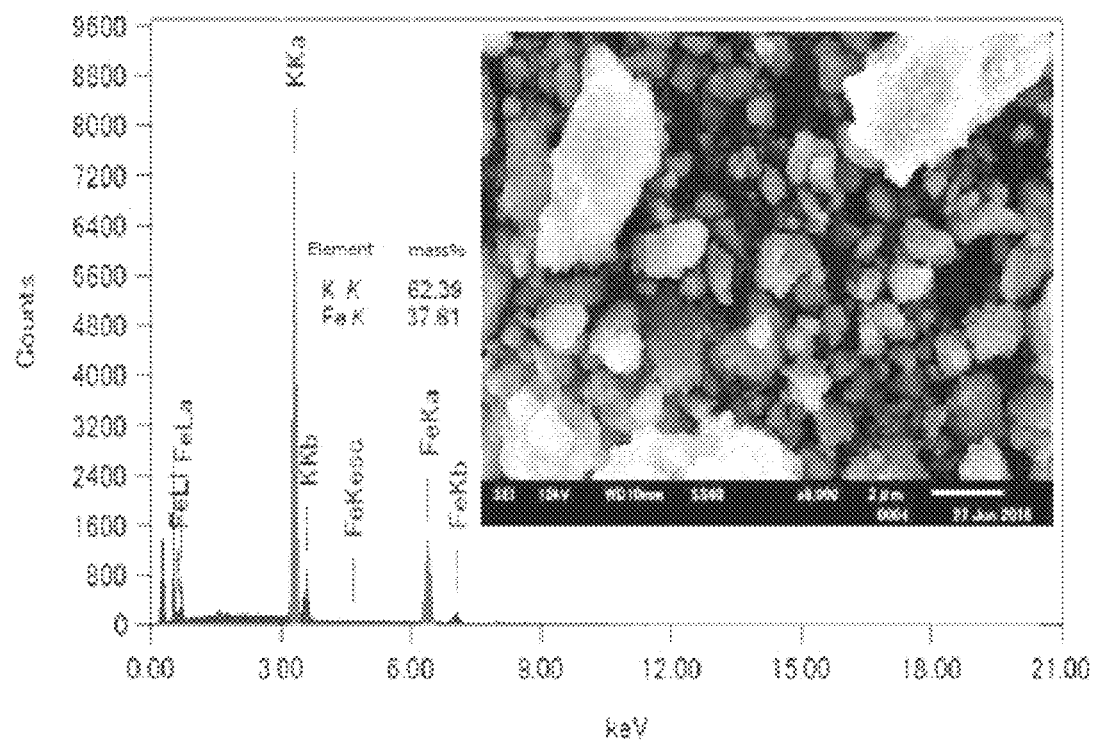
FIG. 11 shows the results of SEM-EDX of $K_2FeO_2$ obtained in Example 2-3.
Figure 12:
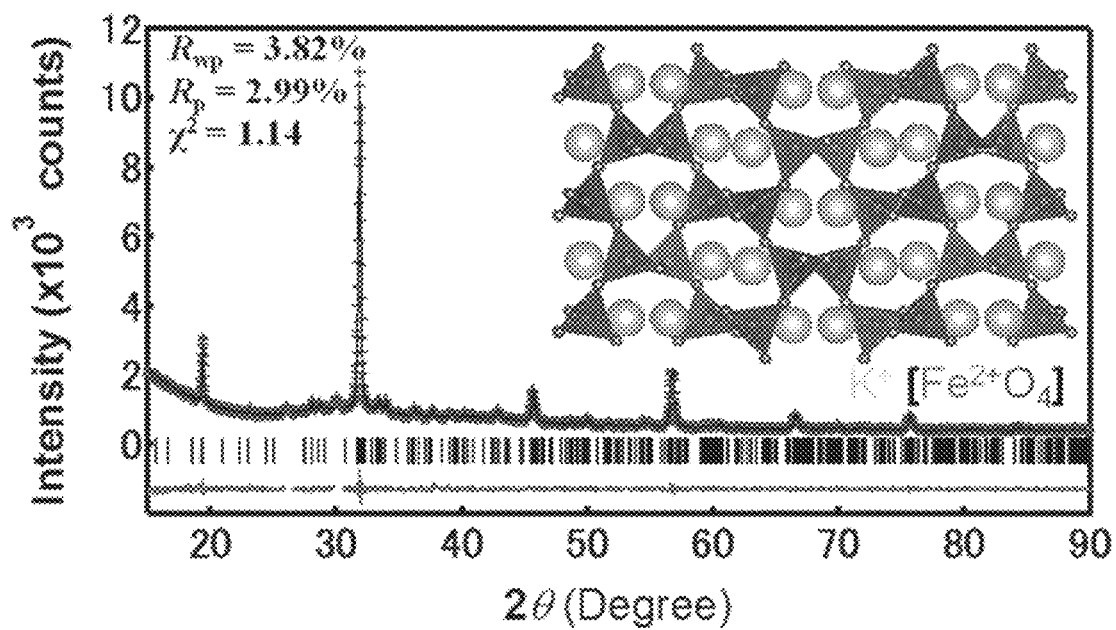
FIG. 12 shows an X-ray diffraction pattern of $K_2FeO_2$ obtained in Example 2-3.

As a result, because all of the Bragg peaks of the sample synthesized by the solid phase method were indexed in the monoclinic lattice, and the presence of the impurity phase, which was observed in starting materials or the products therefrom, was not confirmed, the resulting sample was confirmed to be single-phase $K_2FeO_2$. The results of XRD indicate that $K_2FeO_2$ belongs to the orthorhombic crystal system and the space group Pbca S.G. The lattice constants according to the Rietveld method were such that a=5.6039 (6) Å, b=11.2987(8) Å, c=15.8733(13) Å, and V=1005.0(2) Å$^3$. The reliability factors were such that $R_{wp}$=3.82%, $R_p$=2.99%, and $x^2$=1.14. The element composition in the crystals was analyzed by EDX shown in FIG. 11. As a result, K was contained in an amount of 62.39 mass %, and Fe was contained in an amount of 37.61 mass % based on 100 mass % of the total metal content, confirming that $K_{1.63}FeO_2$ was obtained. In the $K_2FeO_2$ crystal structure shown in FIG. 12, adjacent $FeO_4$ tetrahedrons are connected via oxygen at the top to form a structure similar to that of cristobalite.

Figure 13:
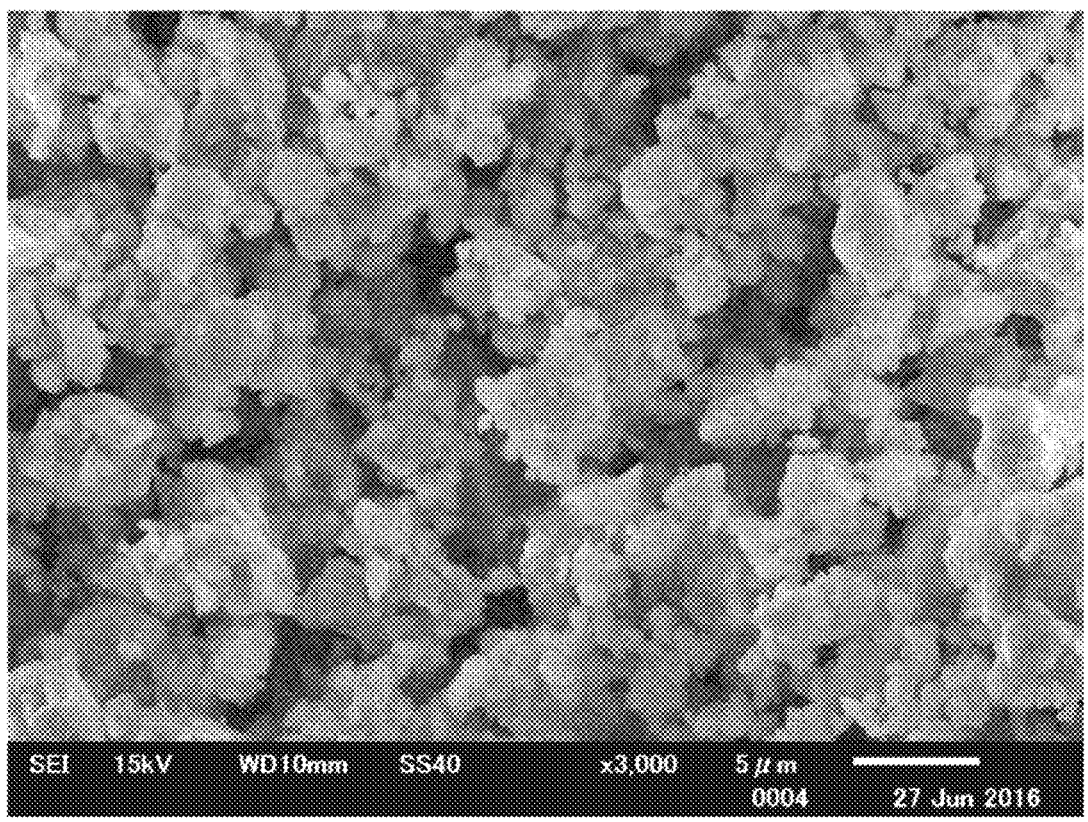
FIG. 13 is an SEM image of $K_2FeO_2$ obtained in Example 2-3.
Figure 14:
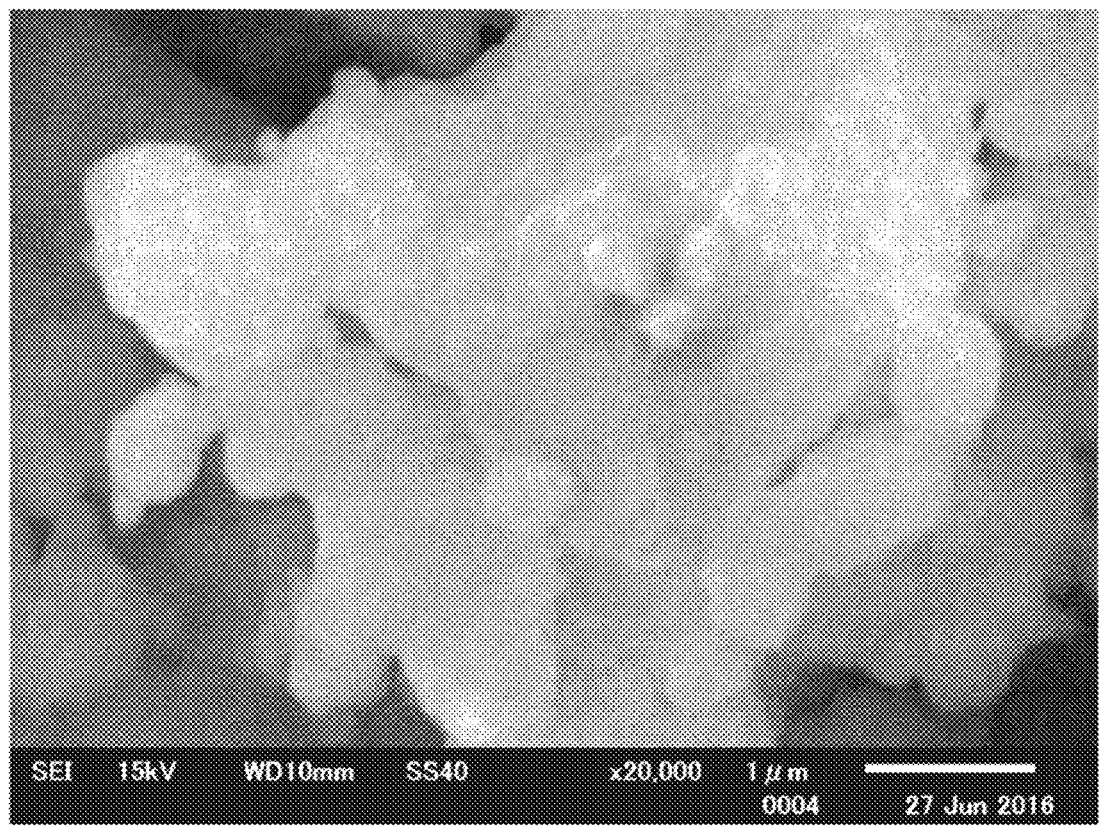
FIG. 14 is a high-resolution SEM image of $K_2FeO_2$ obtained in Example 2-3.

$K_2FeO_2$ obtained in Example 2-3 was observed using a scanning electron microscope and a high-resolution scanning electron microscope. FIGS. 13 and 14 show the results. The results shown in FIGS. 13 and 14 reveal that $K_2FeO_2$ having a particle diameter of approximately 5 μm is obtained.

Figure 15:
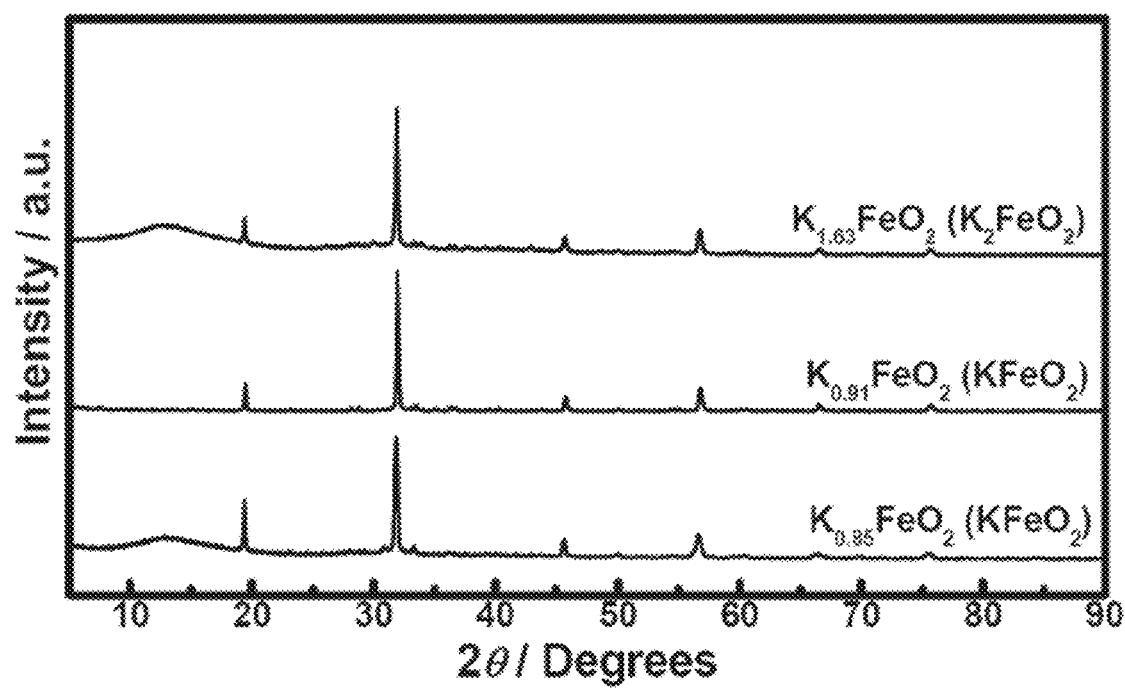
FIG. 15 shows X-ray diffraction patterns of $K_nFeO_2$ obtained in Examples 2-2 to 2-3.

FIG. 15 shows X-ray diffraction patterns of $K_nFeO_2$ obtained in Examples 2-2 to 2-3. In the figure, the formulae in the parentheses are based on the feed composition. From the results, it can be understood that similar peaks are obtained in each composition, and that similar crystals are obtained.

Figure 16:
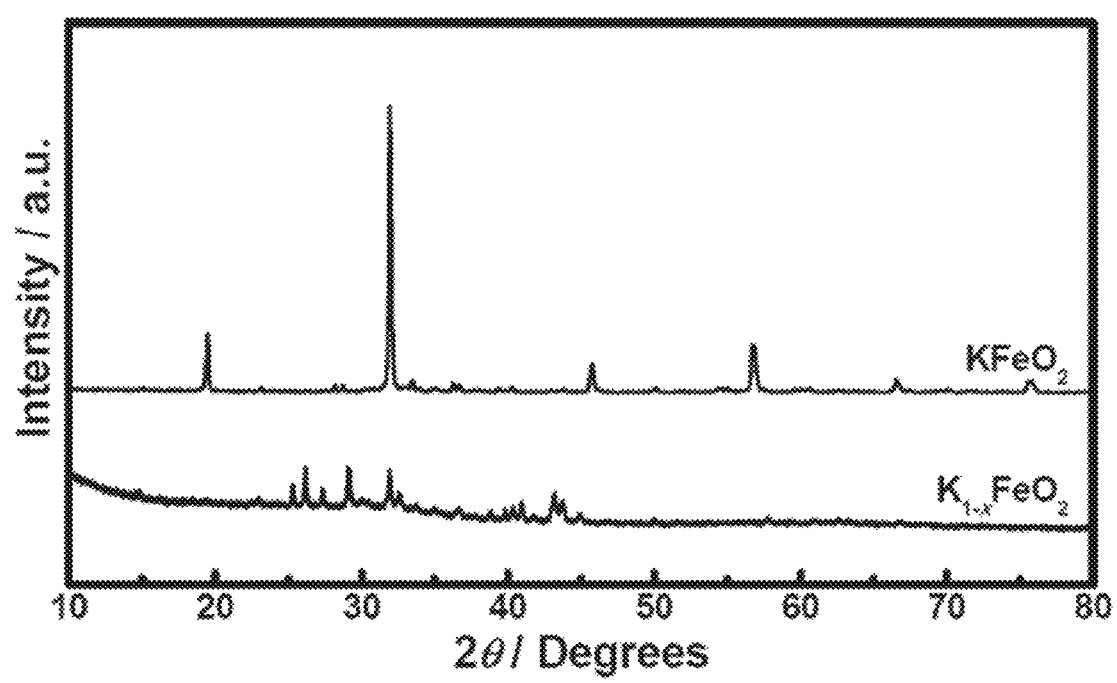
FIG. 16 shows X-ray diffraction patterns of $KFeO_2$ obtained in Example 2-2 before and after oxidation treatment.

Subsequently, $KFeO_2$ obtained in Example 2-2 was oxidized, and part of K was extracted to form $K_{1-x}FeO_2$. FIG. 16 shows the X-ray diffraction patterns before and after oxidation. From the results, it can be understood that extraction of K makes the strongest peak small, thus changing the crystal structure. This specifically indicates that when the potassium compound of the present invention is used as a positive electrode active material, K is extracted with a charge. This suggests that the potassium compound of the present invention can be used as an electrode active material for potassium ion secondary batteries.

Test Example 3: Examination of Potassium Extraction/Insertion (Li Half Cell)

Charge-discharge measurement was performed as in Test Example 1.

To perform charge-discharge measurement, $KFeO_2$ obtained in Example 2-1, polyvinylidene fluoride (PVDF), and acetylene black (AB) were mixed in a mass ratio of 85:7.5:7.5 in an agate mortar. The resulting slurry was applied to aluminum foil (thickness: 20 μm), which was a positive electrode current collector, and the resultant was punched into a circle (diameter: 8 nm) to obtain a positive electrode. Further, pressure-bonding was performed at 30 to 40 MPa so that the sample was not separated from the positive electrode current collector.

Figure 17:
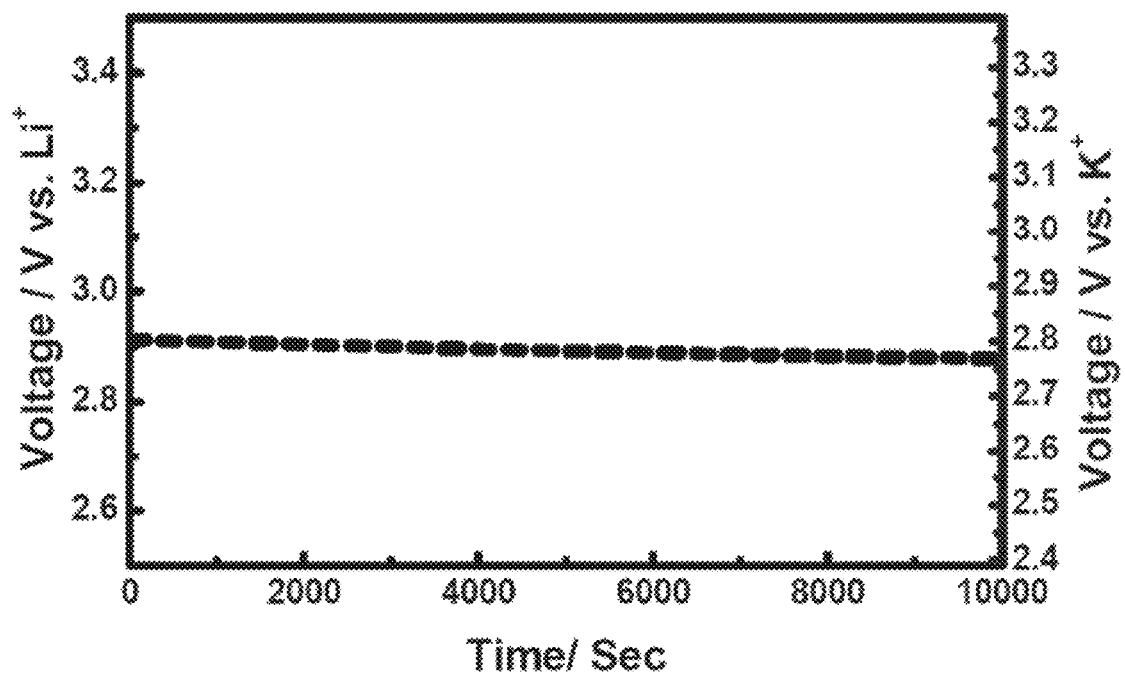
FIG. 17 is a graph showing the open-circuit potential measurement results of Test Example 3.

Metal lithium punched with a diameter of 14 mm was used as a negative electrode, and two pieces of porous Celgard 2500 cut out with a diameter of 18 mm were used as separators. An electrolyte solution (Kishida Chemicals) in which $LiPF_6$ was dissolved as a supporting electrolyte at a concentration of 1 mol dm$^{-3}$ in a solvent containing ethylene carbonate (EC) and diethyl carbonate (DEC) in a volume ratio of 1:2 was used. The battery was produced in a glove box in an Ar atmosphere because metal lithium was used and any mixing of water with the electrolyte solution that happened became a factor of increasing resistance increment. The Cr2032 coin cell shown in FIG. 3 was used as a cell. Constant-current, charge-discharge measurement was performed using a voltage switching device by setting the electric current to 10 mAg$^{-1}$, the maximum voltage to 4.8 V, and the minimum voltage to 1.5 V, and by starting with a charge. The charge-discharge measurement was performed with the cell in a 55° C. thermostat bath. As shown in FIG. 17, the results indicate the open-circuit voltage of the $KFeO_2$ sample is about 2.9 V. This value is about 2.8 V vs. K$^+$ as calculated based on the potassium potential. This material is therefore expected to be a high potential positive electrode material.

Figure 18:
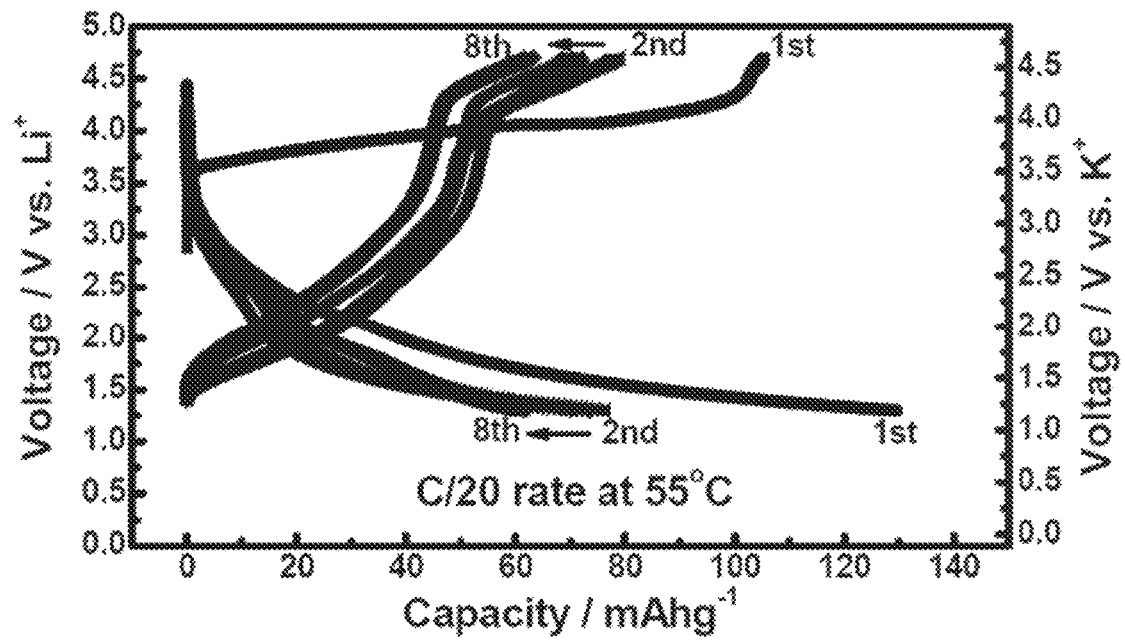
FIG. 18 is a graph showing the charge-discharge test results of Test Example 3.

Subsequently, the results of charge-discharge characteristics (relationship between each cycle and discharge capacity) obtained by the use of the resulting $KFeO_2$ are shown in FIG. 18. The results of FIG. 18 indicate that the initial drawing capacity (charge capacity) is 130 mAhg$^{-1}$, and the resulting positive material is expected to be a high capacity material. Additionally, the theoretical capacity is about 211 mAhg$^{-1}$.

Test Example 4: Examination of Cation Extraction/Insertion (K Half Cell)

Figure 19:
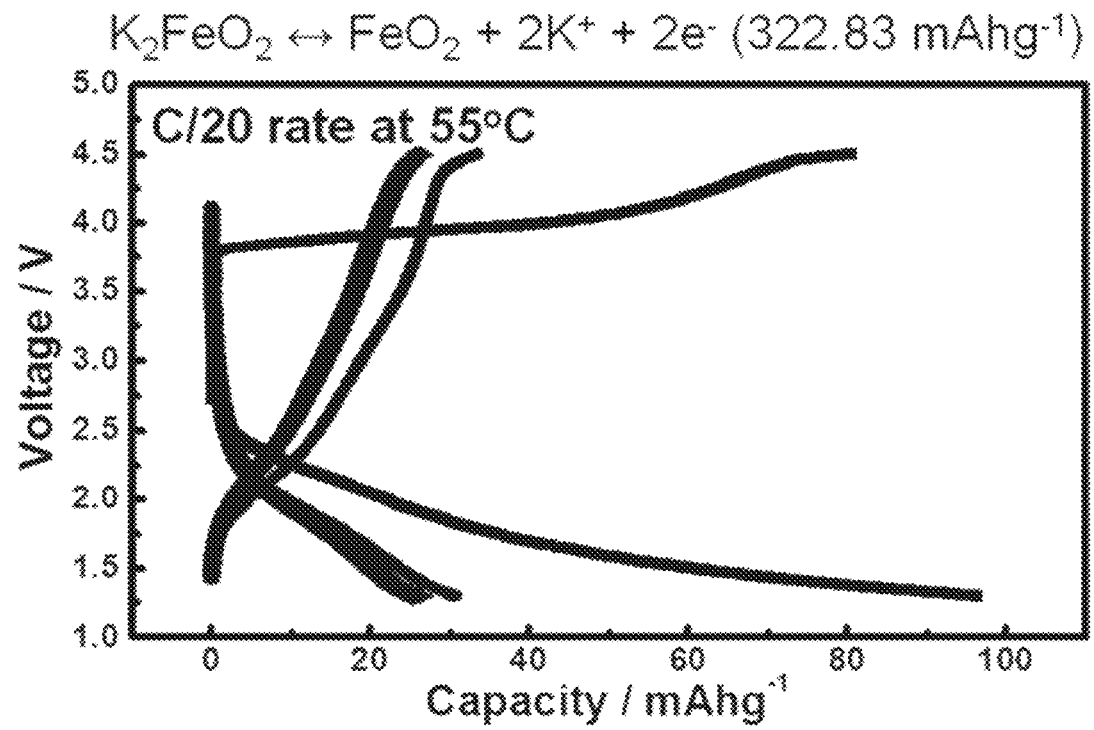
FIG. 19 is a graph showing the charge-discharge test results of Test Example 4.

A test was conducted as in Test Example 3 except that $K_2FeO_2$ obtained in Example 2-4 was used as a positive electrode active material, an electrolyte solution obtained by dissolving supporting electrolyte $LiPF_6$ at a concentration of 1 mol dm$^{-3}$ in propylene carbonate (PC) was used, and the test was started with a discharge. FIG. 19 shows the results.

Test Example 5: Examination of Potassium Ion Extraction/Insertion (Potassium Ion Secondary Battery)

Charge-discharge measurement was performed as in Test Example 2 using $KFeO_2$ obtained in Example 2-1 as a positive electrode active material.

Figure 20:
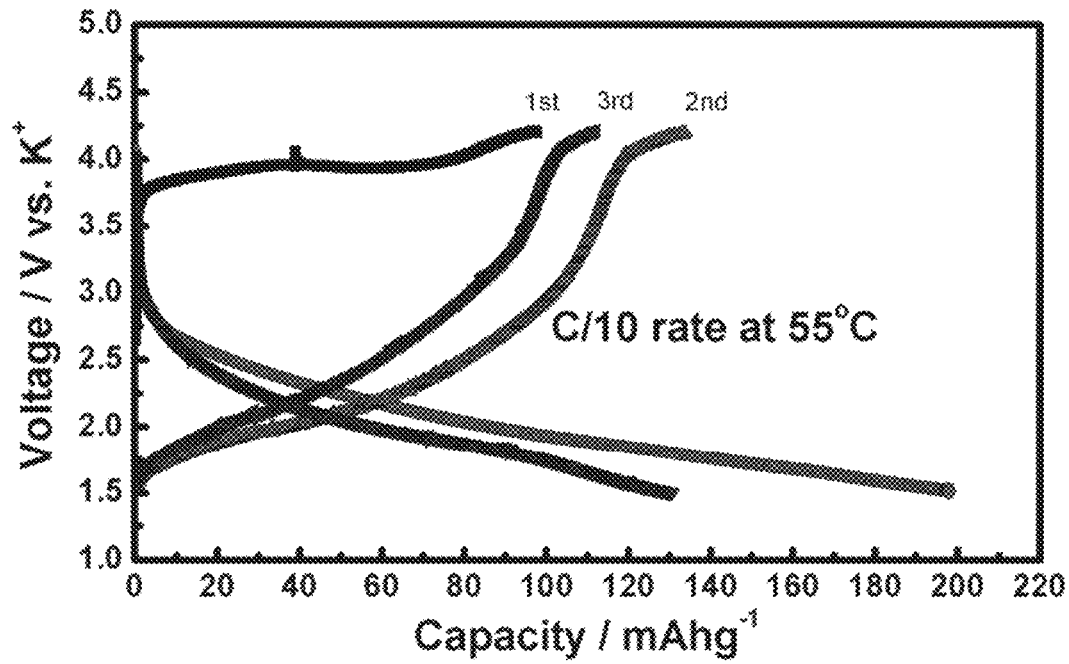
FIG. 20 is a graph showing the charge-discharge test results of Test Example 5.
Figure 21:
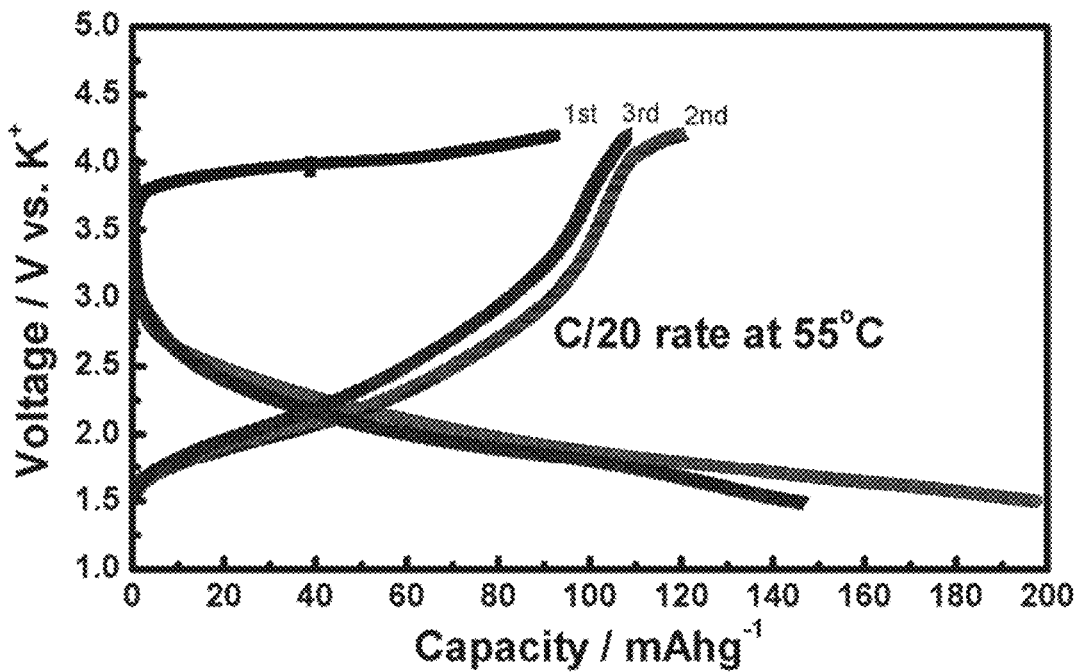
FIG. 21 is a graph showing the charge-discharge test results of Test Example 5.

The CR2032 coin cell shown in FIG. 3 was used as a cell. Natural graphite was used as a negative electrode. Potassium bis trifluoromethane sulfonyl imide (KTFSI) was used as an electrolyte, and an electrolyte solution obtained by dissolving KTFSI at a concentration of 1M (mol dm$^{-3}$) in a propylene carbonate (PC) solvent was used. Constant-current, charge-discharge measurement was performed using a voltage switching device by setting the maximum voltage to 4.2 V, and the minimum voltage to 1.5 V, and by starting with a charge. The charge-discharge measurement was performed with the cell in a 55° C. thermostat bath. In order to avoid the influence of the air exposure due to the hygroscopicity of the potassium-containing compound, the means for producing a battery etc. was performed in a glove box in which an Ar atmosphere was maintained. FIGS. 20 and 21 show the results. As a result, the attainable capacity (charge capacity) at a current density rate of C/10 (about 21 mAhg$^{-1}$) was 130 mAhg$^{-1}$, and the average voltage was about 2.3 V. Further, the drawing capacity (charge capacity) at a current density rate of C/20 (about 11 mAhg$^{-1}$) was also about 130 mAhg$^{-1}$, and the average voltage was about 2.3 V. From the results, the resulting positive electrode active material is expected to be an active material with high capacity and high potential. The theoretical capacity extracted by the extraction and insertion of K$^+$ is about 211 mAhg$^{-1}$.

Example 3: $K_nMnO_2$ $K_2CO_3$ and $MnC_2O_4$ were used as starting material powders. Synthesis operation was performed in a dry room to prevent water absorption of $K_2CO_3$. $K_2CO_3$ and $MnC_2O_4$ were weighed so that the molar ratio of potassium:manganese was 2:1, and mixed in an agate mortar for about 30 minutes. The mixture was formed into pellets and fired in an electric furnace in air at 1000° C. for 1 hour. As a sample preparation method for avoiding the influence of the air exposure due to the hygroscopicity of the resulting product, the product obtained after firing was placed in a glove box in which an Ar atmosphere was maintained, and stored in a non-contact environment with air. The product ($K_2MnO_2$) was confirmed by X-ray diffraction measurement.

Test Example 6: Examination of Cation Extraction/Insertion (K Half Cell)

Figure 22:
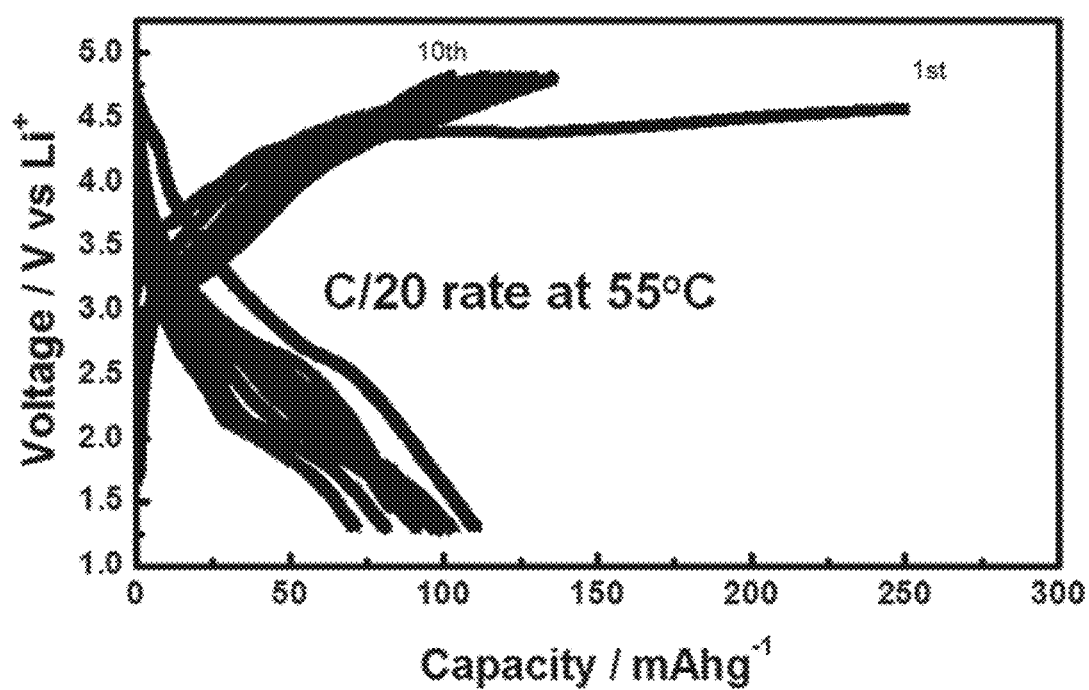
FIG. 22 is a graph showing the charge-discharge test results of Test Example 6.

A test was conducted as in Test Example 3 except that $K_2MnO_2$ obtained in Example 3 was used as a positive electrode active material, and an electrolyte solution obtained by dissolving supporting electrolyte $LiPF_6$ at a concentration of 1 mol dm$^{-3}$ in propylene carbonate (PC) was used. FIG. 22 shows the results.

EXPLANATION OF SYMBOLS

1 Potassium ion secondary battery
2 Negative electrode terminal
3 Negative electrode
4 Separator impregnated with electrolyte
5 Insulating packing
6 Positive electrode
7 Positive electrode can

The invention claimed is:

1. A potassium ion secondary battery comprising a positive electrode, the positive electrode containing an active material that includes a potassium compound represented by general formula (1): $K_nMO_m$,
wherein M is copper, iron, or manganese, n is 1.63 to 3.5, and m is 1.5 to 2.5.

2. The potassium ion secondary battery according to claim 1, wherein the potassium compound has an orthorhombic structure and/or monoclinic structure.

3. The potassium ion secondary battery according to claim 1, wherein the potassium compound has a mean particle diameter of 0.2 to 50 μm.

4. A method for producing the active material in the potassium ion secondary battery according to claim 1, the method comprising a heating step of heating a mixture containing potassium, oxygen, and copper, iron, or manganese.

5. The method according to claim 4, wherein the heating temperature in the heating step is 500 to 1500° C.

6. The potassium ion secondary battery according to claim 1, wherein the electrode further comprises a conductive material.

7. A potassium ion secondary battery comprising a positive electrode, the positive electrode containing an active material that includes a potassium compound represented by general formula (1): $K_nMO_m$, wherein M is copper or iron, n is 0.5 to 3.5, and m is 1.5 to 2.5.

8. A The potassium ion secondary battery according to claim 7, wherein the potassium compound has an orthorhombic structure and/or monoclinic structure.

9. The potassium ion secondary battery according to claim 7, wherein the potassium compound has a mean particle diameter of 0.2 to 50 μm.

10. A method for producing the active material in the potassium ion secondary battery according to claim 7, the method comprising a heating step of heating a mixture containing potassium, oxygen, and copper or iron.

11. The method according to claim 10, wherein the heating temperature in the heating step is 500 to 1500° C.

12. The potassium ion secondary battery according to claim 7, wherein the electrode further comprises a conductive material.

\* \* \* \* \*